United States Patent
Few

(10) Patent No.: US 6,722,397 B2
(45) Date of Patent: Apr. 20, 2004

(54) AUTOMOTIVE FLUID SERVICING APPARATUS

(75) Inventor: Jeffrey P. Few, Elkhart, IN (US)

(73) Assignee: Norco Industries, Inc., Compton, CA (US)

( * ) Notice: Subject to any disclaimer, the term of this patent is extended or adjusted under 35 U.S.C. 154(b) by 0 days.

(21) Appl. No.: 10/280,260

(22) Filed: Oct. 25, 2002

(65) Prior Publication Data

US 2003/0079799 A1 May 1, 2003

Related U.S. Application Data

(60) Provisional application No. 60/350,157, filed on Oct. 29, 2001.

(51) Int. Cl.$^7$ ................................................ B65B 1/04
(52) U.S. Cl. .............................. 141/65; 141/2; 141/18; 141/59; 141/192; 184/1.5
(58) Field of Search ................................ 141/2, 4, 5, 7, 141/21, 46, 59, 65–67, 83, 94, 95, 198, 367, 378; 184/1.5, 105.1

(56) References Cited

U.S. PATENT DOCUMENTS

| | | |
|---|---|---|
| 3,513,941 A | 5/1970 | Becnel |
| 4,703,773 A | 11/1987 | Hansen et al. |
| 4,745,989 A | 5/1988 | DiMatteo |
| 4,938,315 A | 7/1990 | Ohta et al. |
| 5,056,621 A | 10/1991 | Trevino |
| 5,273,085 A | 12/1993 | Edwards et al. |
| 5,289,837 A | 3/1994 | Betancourt |
| 5,291,968 A | 3/1994 | Brown |
| 5,318,080 A | 6/1994 | Viken |
| 5,318,700 A | 6/1994 | Dixon et al. |
| 5,337,708 A | 8/1994 | Chen |
| 5,370,160 A | 12/1994 | Parker |
| 5,372,219 A | 12/1994 | Peralta |
| 5,415,247 A | 5/1995 | Knorr |
| 5,427,202 A | 6/1995 | Behring et al. |
| 5,447,184 A | 9/1995 | Betancourt |
| 5,472,064 A | 12/1995 | Viken |
| 5,482,062 A | 1/1996 | Chen |
| 5,522,474 A | 6/1996 | Burman |
| 5,535,849 A | 7/1996 | Few |
| 5,586,583 A | 12/1996 | Edwards et al. |
| 5,603,482 A | 2/1997 | Mott et al. |
| 5,615,704 A | 4/1997 | Sell |
| 5,617,771 A | 4/1997 | Landrum |
| 5,626,170 A | 5/1997 | Parker |
| 5,635,625 A | 6/1997 | Tsunoda |
| 5,669,464 A | 9/1997 | Earleson |
| 5,743,357 A | 4/1998 | Few |
| 5,806,629 A | 9/1998 | Dixon et al. |

(List continued on next page.)

FOREIGN PATENT DOCUMENTS

JP 2-72299 3/1990

OTHER PUBLICATIONS

Chinese promotional material for ATF changer WH–202 with translation, pre–2000 publication.
Japanese promotional material for AFC–6000 with translation purportedly printed in Nov. 1991.
Japanese promotional material for AFC–9800 with translation, pre–2000 publication.

*Primary Examiner*—Gregory Huson
*Assistant Examiner*—Peter DeVore
(74) *Attorney, Agent, or Firm*—Fulwider Patton Lee & Utecht LLP

(57) ABSTRACT

A servicing apparatus for exchanging fluid between a serviceable automobile component and new and used fluid tanks and including a manifold with a fluid circuit defining a plurality of pathways connecting a plurality of ports whereby fluid is directed through the fluid circuit and ports by selectively operating first and second valves and circulated using a common pump to exchange fluid, recirculate fluid, and drain both the used and new fluid tanks as desired.

50 Claims, 10 Drawing Sheets

U.S. PATENT DOCUMENTS

| | | |
|---|---|---|
| 5,853,068 A | 12/1998 | Dixon et al. |
| 6,035,903 A | 3/2000 | Few et al. |
| 6,062,275 A | 5/2000 | Rome et al. |
| 6,131,701 A | 10/2000 | Camacho et al. |
| 6,170,505 B1 | 1/2001 | Erwin |
| 6,213,175 B1 | 4/2001 | Rome et al. |
| 6,247,509 B1 | 6/2001 | Rome et al. |
| 6,347,872 B1 | 2/2002 | Brechbill et al. |
| 6,360,791 B2 | 3/2002 | Rome et al. |
| 6,382,271 B1 | 5/2002 | Betancourt et al. |
| 6,435,223 B1 | 8/2002 | Betancourt et al. |
| 6,446,682 B1 | 9/2002 | Viken |
| 2002/0063018 A1 | 5/2002 | Schippers |

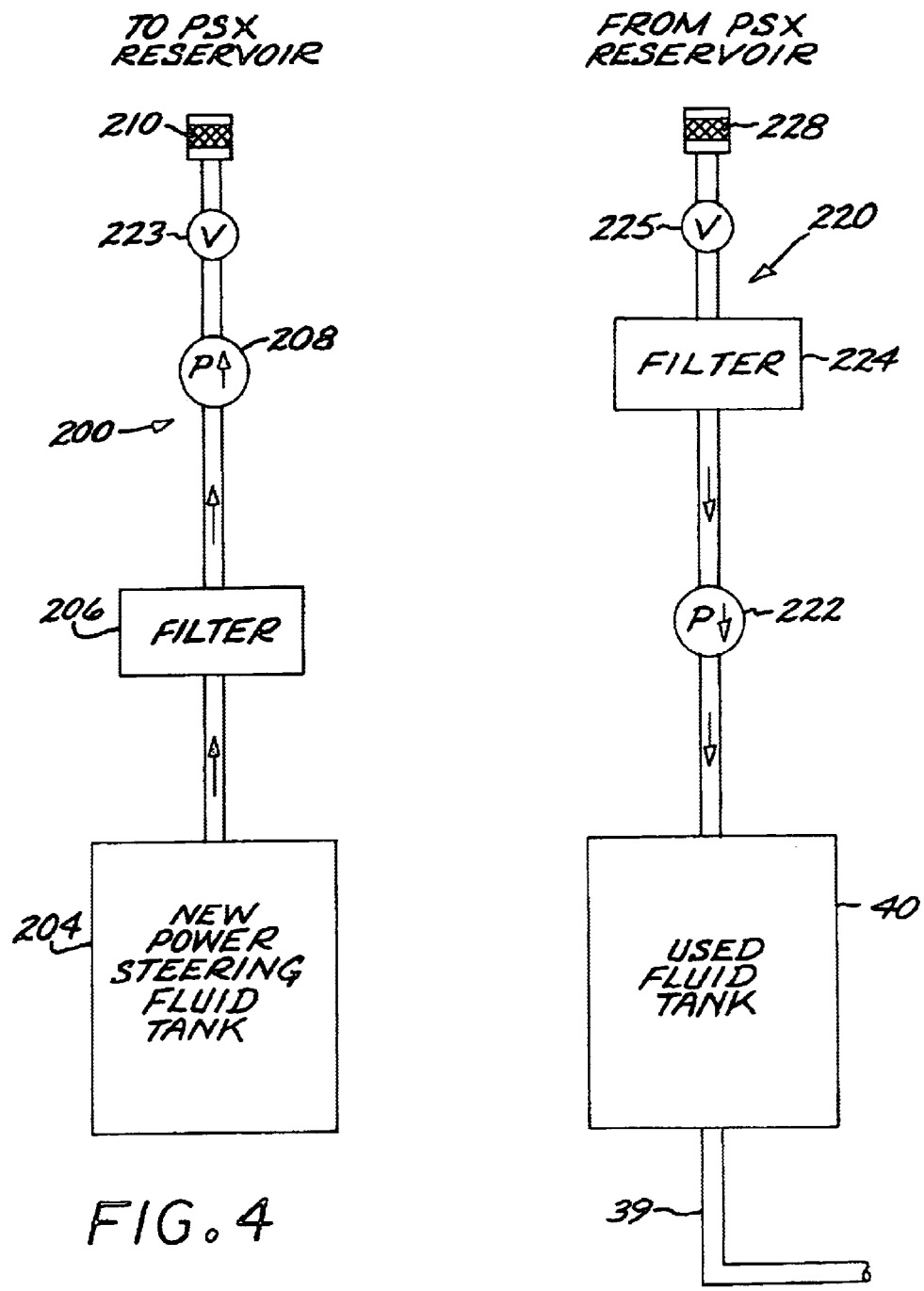

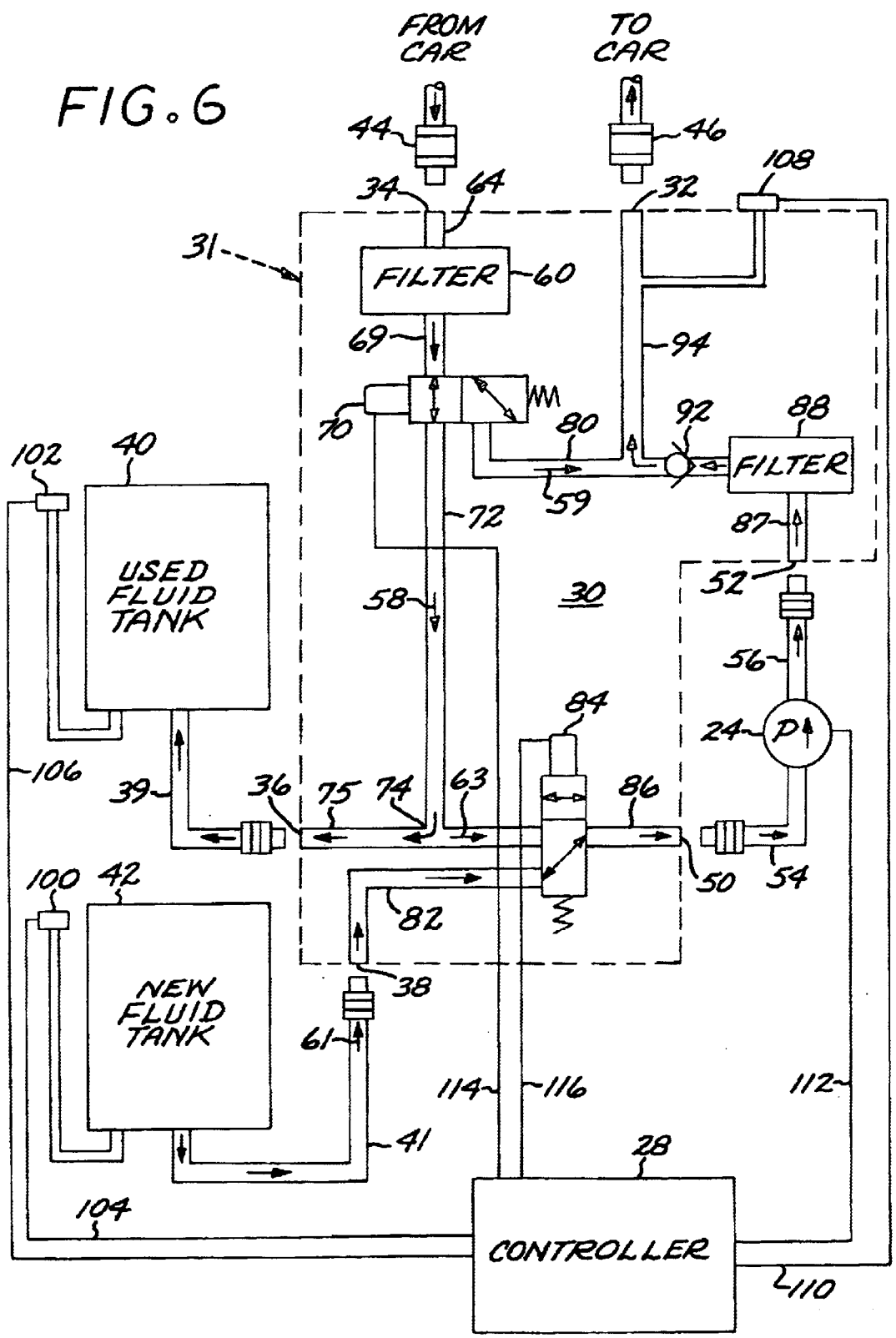

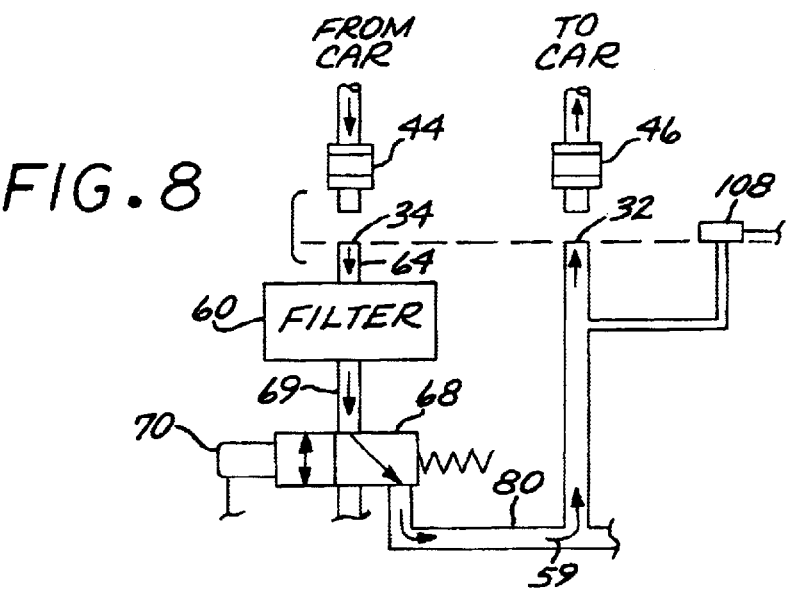
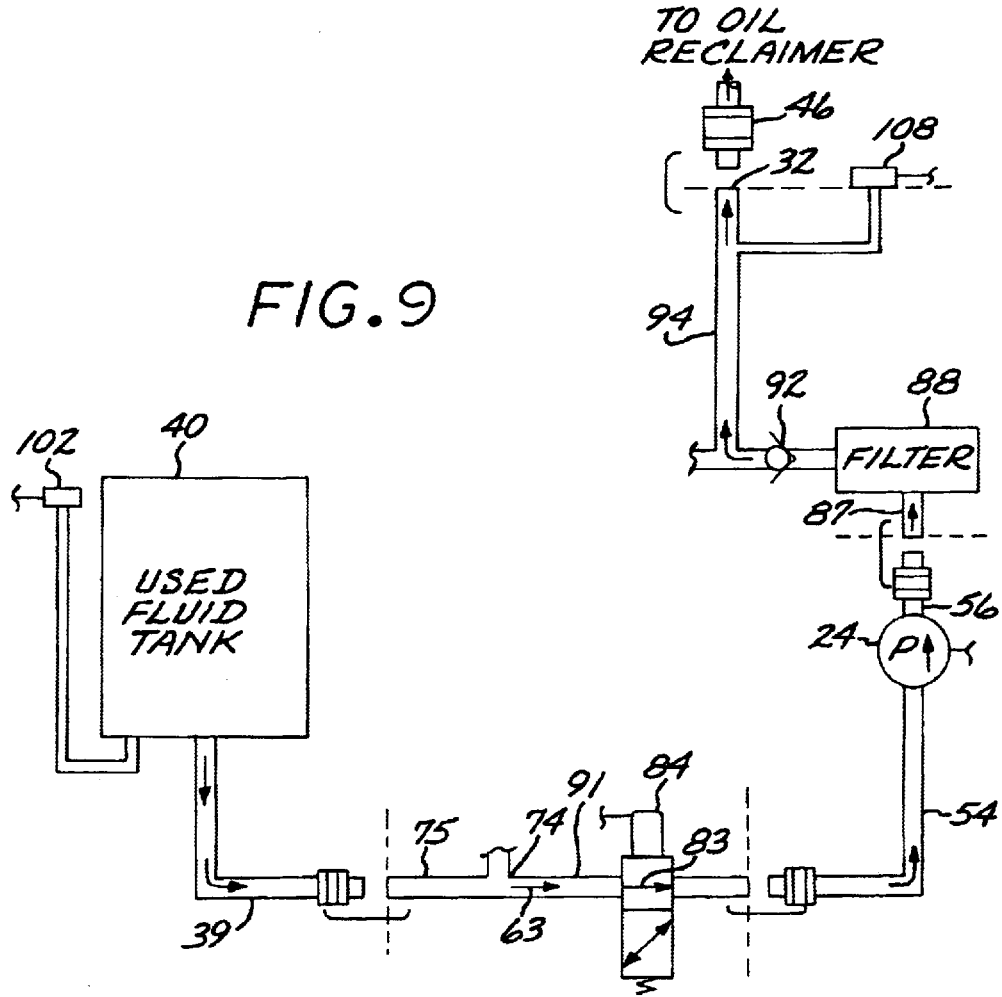

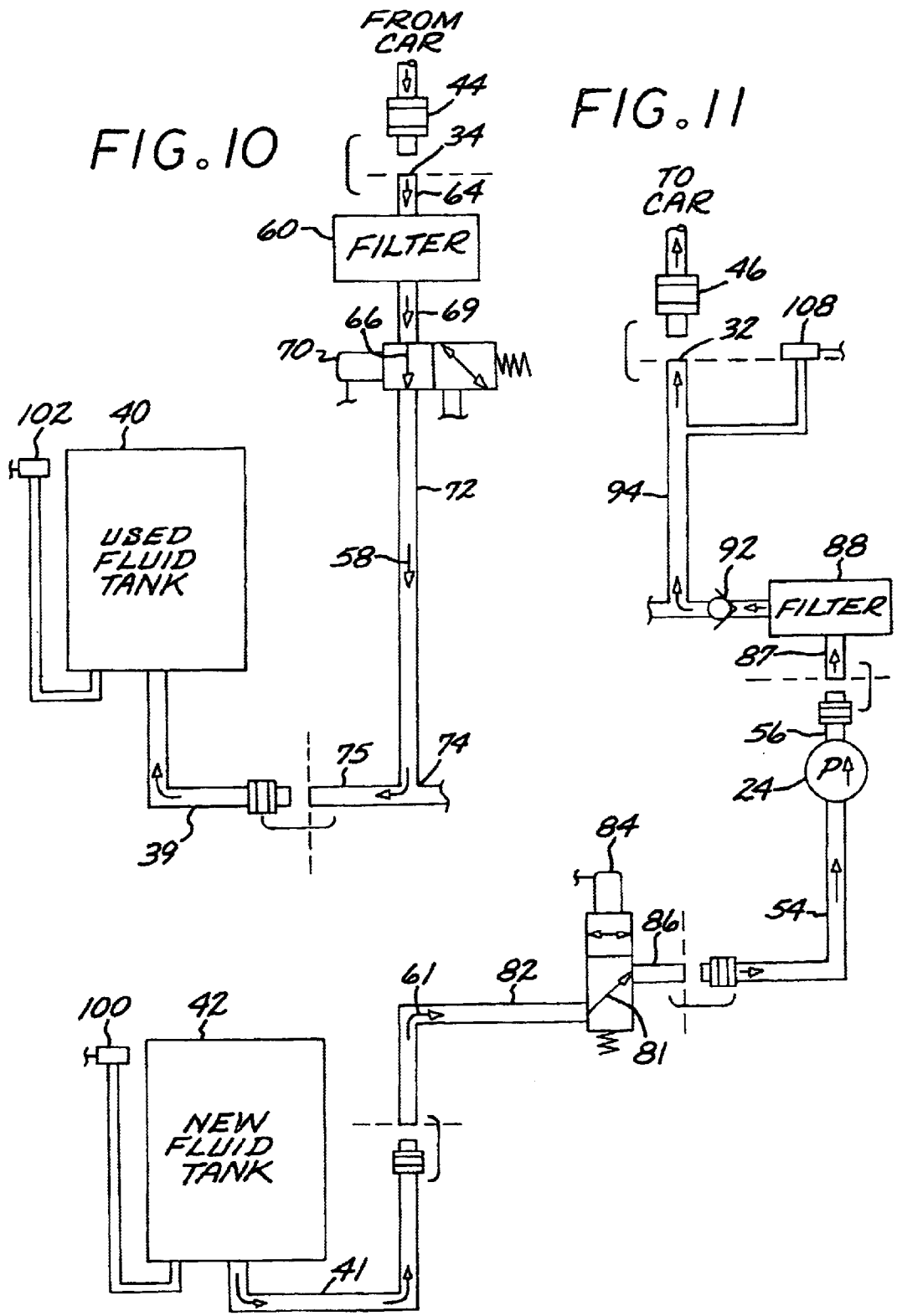

AUTOMOTIVE FLUID SERVICING APPARATUS

This application is a continuation-in-part of provisional application No. 60/350,157, entitled Remotely Operated Vehicle Fluid Exchange System, filed on Oct. 29, 2001, which is hereby incorporated by reference in its entirety.

BACKGROUND OF THE INVENTION

1. Field of the Invention

The present invention relates to the field of vehicle maintenance, and more specifically, to servicing automatic transmission subsystems.

2. Background

Automatic transmissions frequently require servicing such as replacing used fluid with fresh fluid in order to properly maintain them and extend the life of the component and associated vehicle. Early attempts at developing automatic transmission fluid transfer machines often resulted in relatively lengthy and complicated procedures. Many of these devices relied upon compressed gases to circulate the fluid and thus required some sort of compressed air source adding to the device's complexity. Such early attempts also required significant manual operation and supervision as the operator had to continually monitor gauges and other instruments to monitor the fluid flow to achieve the desired performance.

While some of these devices proved satisfactory for their time, the next level of automatic transmission fluid transfer machines introduced a degree of automation to the fluid exchange process thus reducing the extent of operator intervention. However, the plumbing proposed in an effort to automate the process and perform the steps typically associated with a complete automatic transmission fluid service, typically employed a relatively large number of plumbing components such as multiple dedicated pumps, gauges, and several valves. While many of these devices have also proven satisfactory in their performance there remains a push for reducing the number of components, cost of manufacture, and reduced assembly time while maintaining the capability to perform the desired procedures.

Efforts to resolve this long standing problem led to the introduction of a number of devices of the single pump variety. Some examples of these single pump devices can be found in U.S. Pat. Nos. 5,482,062 and 5,337,708 to Chen; U.S. Pat. No. 5,447,184 to Betancourt; U.S. Pat. No. 5,472,064 to Viken; U.S. Pat. No. 6,035,903 to Few, owned by assignee of this application; and Japanese Unexamined Patent Application No. 2-72299. It is clear from a review of the devices shown in these patents that, while success was achieved in reducing some number of components, such as the pumps, it was necessary to increase the remaining plumbing in order to perform the necessary fluid transfer processes such as complete fluid exchange, recirculation, and draining both used and new fluid tanks or such desired processes could not performed using a single pump. Frequently a separate drain pump or a more complicated and costly reversible pump has been incorporated to perform the desired fluid servicing tasks. While some of these devices, such as that described in U.S. Pat. No. 6,035,903, have proven satisfactory in the field, there remains the ever present need to develop a fluid changing apparatus with a minimal number of components to reduce costs, maintenance, and assembly time, yet still perform the fluid servicing procedures associated with an automatic transmission service.

What is needed is a fluid changing apparatus configured to conveniently address the needs of the fluid change operator using a single pump configuration integrated into a relatively minimal component fluid transfer system, something the previous attempts have failed to achieve up to this time.

SUMMARY OF THE INVENTION

In accordance with the present invention, an apparatus and method for performing fluid exchange servicing functions for a vehicle is described herein and more particularly for servicing the transmission components of a vehicle system. Such servicing apparatus generally includes a manifold defining a number of ports and a fluid circuit defining a plurality of pathways for transporting fluid therebetween wherein select ports may be coupled to new and used fluid tanks and other select ports may be coupled to the inlet and outlet ports of the vehicle component to be serviced. Such fluid circuit having a number of in line plumbing components including a selectively operable valving component and a pump for circulating fluid and routing fluid between the ports to perform a variety of fluid related service processes.

In one particular embodiment, such valving component includes a first valve with one side in fluid communication with a first port and a second side in fluid communication with either a used fluid port or a second port and further including a second valve having a first end in communication with the pump and a second end in communication with a used fluid port and a new fluid port.

In yet another embodiment, the servicing apparatus includes either a manual or automatic valve capable of reversing the flow entering and exiting the apparatus through first and second ports.

Another option in the present invention is the incorporation of a control board providing access to fluid cycling counts to facilitate a maintenance plan for the servicing apparatus components.

For one embodiment of the present invention the operator may cycle the valving component prior to operation in an exchange process use to test proper functioning of the components.

Other features and aspects of the present invention will become apparent with further reference to the following drawings and specification.

BRIEF DESCRIPTION OF THE DRAWINGS

FIG. 4 is a schematic of an exemplary plumbing circuit for withdrawing used fluid from a power steering reservoir of a vehicle in an alternative embodiment of the automotive fluid servicing apparatus of the present invention;

FIG. 5 is a schematic of an exemplary plumbing circuit for adding new fluid to a power steering reservoir of a vehicle in an alternative embodiment of the automotive fluid servicing apparatus of the present invention;

FIG. 6 is a schematic of an exemplary plumbing circuit for performing servicing procedures in accordance with a preferred embodiment of the automotive fluid servicing apparatus shown in FIG. 1;

FIG. 8 is a partial sectional view taken from the plumbing circuit in FIG. 6 illustrating an exemplary recirculation/bypass fluid path;

FIG. 9 is a partial sectional view taken from the plumbing circuit in FIG. 6 illustrating an exemplary dump fluid path;

FIG. 10 is a partial sectional view taken from the plumbing circuit in FIG. 6 illustrating an exemplary drain fluid path;

FIG. 11 is a partial sectional view taken from the plumbing circuit in FIG. 6 illustrating an exemplary supply fluid path;

DETAILED DESCRIPTION OF THE PREFERRED EMBODIMENTS

Figure 1:
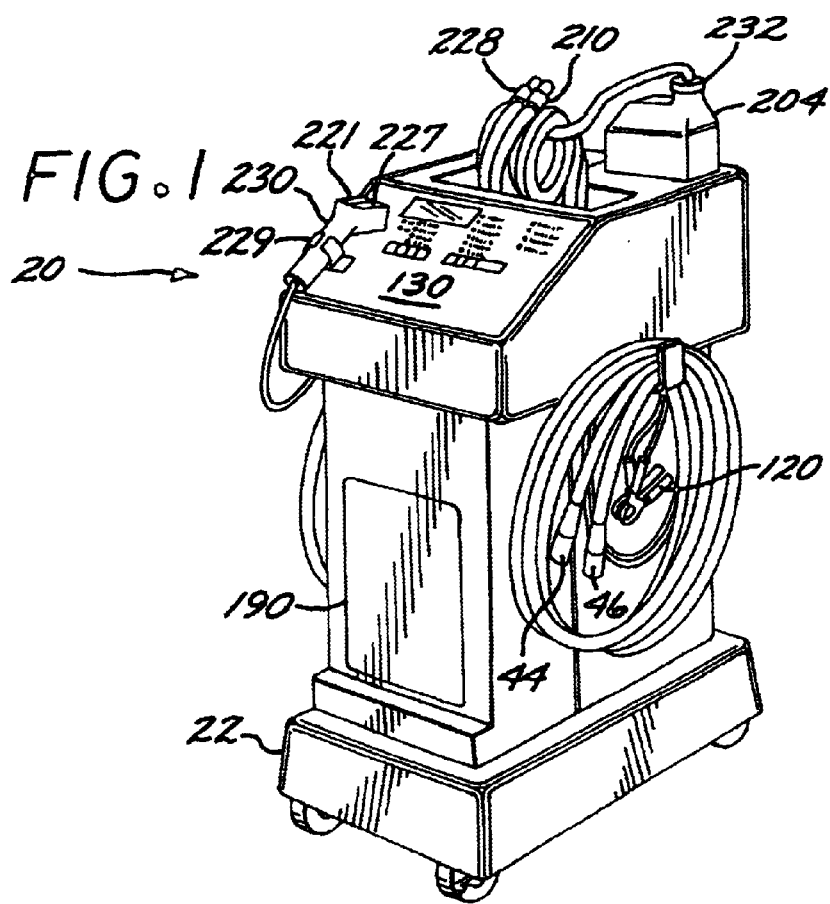
FIG. 1 is a right front perspective view of a preferred embodiment of the automotive fluid servicing apparatus of the present invention.
Figure 3:
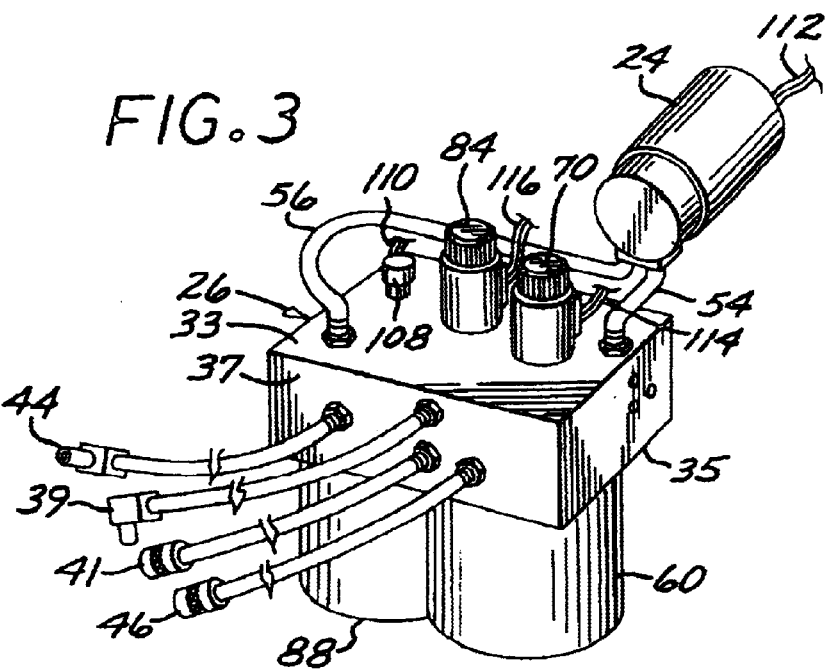
FIG. 3 is a right front perspective view, in enlarged scale, of an exemplary manifold incorporated in the automotive fluid servicing apparatus shown in FIG. 1.

Referring now to FIGS. 1, 3 and 6, an exemplary embodiment of an automotive fluid servicing apparatus, generally designated 20, of the present invention is illustrated. In general, such fluid servicing apparatus is incorporated in a convenient, portable wheeled cabinet 22 housing a plumbing subsystem and an electrical command subsystem cooperating to drain fluid from a serviceable component, add fluid to the serviceable component, circulate fluid between the serviceable component and the apparatus, and drain collected or other stored fluid using a single, common pump 24 and an integrated manifold assembly 26 as directed by a service technician and controlled by a processor/controller 28.
Plumbing Subsystem Turning to FIGS. 3, 6, and 12, at the heart of the plumbing subsystem is the integrated manifold assembly 26 housing a fluid circuit 30 formed in a rectangular manifold body 31 having a top side 33, opposing bottom side 35, rear side 37, front side 43, and two opposing ends 45, 47. The body sides and ends have generally planar surfaces cooperating to form a rectangular block measuring about six inches wide by three inches deep by three inches high and defining a number of manifold ports for connecting to various conduits and other hydraulic components. In this exemplary embodiment, there are six conduit ports.

Figure 12:
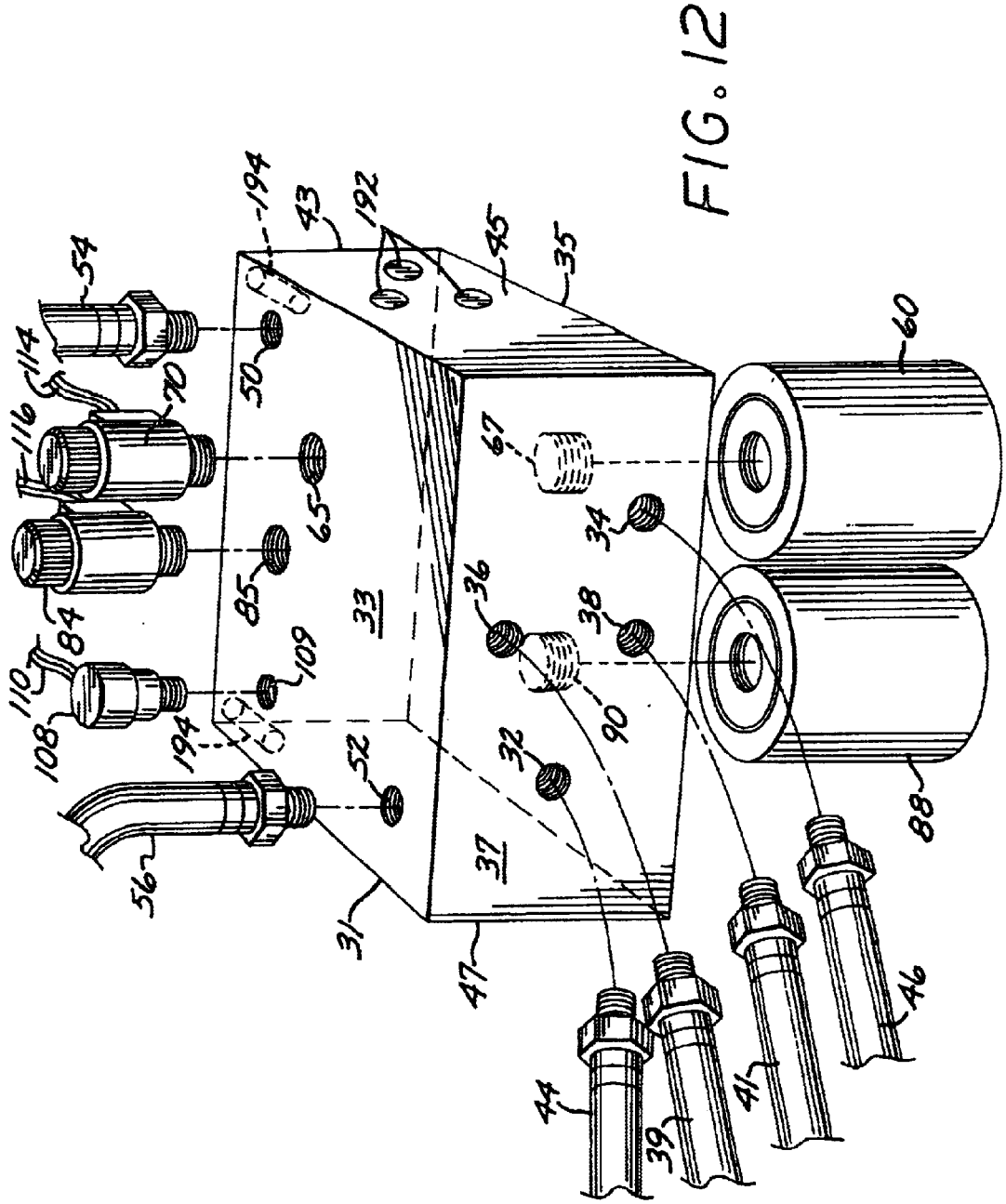
FIG. 12 is a perspective exploded view, in enlarged scale, of the manifold illustrated in FIG. 3.

With particular reference to FIG. 12, an exhaust port 32, a return port 34, a drain port 36, and a fresh fluid supply port 38 open outwardly on the rear side 37 of the manifold body 31. While each of these ports are shown on the same side of the manifold body in FIG. 12, it will be appreciated that the ports may be placed at other suitable locations on the manifold body. For instance, these same manifold ports are shown on different sides of the manifold body 31 in FIG. 6 for ease of description and clarity and may also provide suitable port locations and is not meant to be limiting in any manner. Other suitable locations will occur to one of ordinary skill in the art. Each manifold port is threaded for coupling with one end of a respective conduit, hose, or other suitable tubing or piping, which are in turn connected to a desired source or destination. For ease of assembly, it is preferable to thread one portion of each hose coupling into the respective threaded port opening. The threaded coupling component is constructed to allow the assembler to merely press the free end of the selected conduit into the complementary coupling component threaded into the port. Suitable couplings of this type are available from Parker Hannifin under the TrueSeal trade name.

More specifically, with reference to FIGS. 3, 6, and 12, a used fluid conduit 39 connects between the drain port 36 and a used fluid collection tank 40 to carry fluid therebetween. Similarly, the fresh fluid supply port 38 connects via a new fluid supply conduit 41 to a new fluid tank 42. Such used fluid collection tank 40 is constructed to hold a sufficient amount of used fluid to accommodate at least complete drain procedure and preferably more. The new fluid tank 42 is typically constructed to hold a sufficient volume of fresh fluid to accommodate a single fill procedure and preferably has a greater capacity as well. This fresh fluid source 42 may be filled through a fill hole (not shown). As it is preferred that the servicing apparatus maintain a portable capability, the used and new fluid tanks are preferably mounted inside the cabinet 22 (FIG. 1) which is sized to accommodate the preferred tank capacities. It has been found that a 24 quart capacity for both the new and used fluid tanks accommodates most servicing procedures.

With continued reference to FIGS. 3, 6, and 12, further convenience is provided by a set of servicing hoses, 44 and 46 respectively for connecting between the return port 34 and the exhaust port 32 of the servicing apparatus 20 and the influent line and effluent line of the serviceable component such as an automatic transmission as is well known to one of ordinary skill. The use of conventional adapters is also contemplated if necessary. The connectors illustrated in FIG. 3 are exemplary and not meant to be limiting in any manner as other suitable connectors will occur to one of ordinary skill. Such connection places the transmission in fluid communication with the servicing apparatus 20 as will be discussed below. The manifold body 31 further includes a suction port 50 and a pressure port 52 located on the top side 53 of the manifold body (FIG. 12). These ports are also threaded for receiving one part of corresponding suction and pressure hose couplings 54, 56, which are connected at their opposite ends to the respective suction (inlet) and pressure (outlet) sides of the pump 24 to place the pump in fluid communication with the manifold body 31. Such suction and pressure hoses also incorporate press-in connectors for convenience of the assembler.

Still referring to FIG. 6, added to the fluid circuit 30 are a number of pathways formed in the manifold body 31 as well as a number of flow control and filtering components for routing fluid entering and exiting the manifold between the various fluid ports 32, 34, 36, 38, 50 and 52. Referring now to FIGS. 6 and 8–11, in this exemplary embodiment, there are four such pathways including a drain path, generally designated 57, for flow of fluid as indicated by directional arrow 58 (FIGS. 6 and 10), a recirculation path, generally designated 80, for flow of fluid as indicated by directional arrow 59 (FIGS. 6 and 8), a supply path, generally designated 93, for fluid flow as indicated by directional arrow 61 (FIGS. 6 and 11), and a dump path, generally designated 95, for fluid flow as indicated by directional arrow 63 (FIGS. 6 and 9).

It will be appreciated that the manifold body 31 forms a three dimensional fluid circuit and that FIGS. 6 and 8–11 are represented in a two-dimensional layout for ease of description and are not meant to be limiting in any manner. For instance, the fluid ports in FIG. 12 are shown on one side of the manifold body while the same ports are shown on multiple sides of the manifold body in FIG. 6. In addition, in FIG. 6, the manifold body 31 is not depicted as a rectangular block as in FIG. 12. These illustrations are merely to facilitate description of the preferred embodiment. Other suitable port locations and pathways may occur to one of ordinary skill and still fall within the scope of the present invention.

With continued reference to FIGS. 6 and 8–12, each pathway 57, 80, 93, and 95 is generally tubular in transverse cross section and made up of adjacent passage segments bored into the manifold body 31 which are configured with straight runs meeting at right angles and compacted to minimize the size of the manifold body and further reduce hose length requirements between components coupled to the manifold body and overall hose length requirements of the servicing apparatus. Some of these right angle segments project into or out of the plane of the paper and may not be shown in FIGS. 6, or 8–11. It will also be appreciated, when considered from end to end, portions of each pathway may extend outside the manifold body and include couplings or connectors of flexible or rigid material connected to one or more manifold ports.

With particular reference to FIGS. 6, 10, and 12, during a drain procedure as will be discussed below, fluid is normally directed in the direction of arrow 58 through the drain path 57 from the return port 34 to the used fluid drain port 36 which may be connected to the used fluid collection tank 40 via conduit 39. Such passage 57 is formed by an entry bore extending into the manifold body 31, viewed into the paper in FIG. 6, from the return port 34 to enter a short pre-filter segment 64 which turns downwardly at a right angle from the entry bore, toward an aperture (not shown) in the bottom side 35 of the body aligned with a fluid entrance into an in-line filter 60 to direct fluid into the filter. The filter 60 is coupled to a hollow, threaded nipple 67 projecting from the bottom side 35 of the manifold. The nipple is screwed into an opening in the bottom side of the manifold body and further extends outside the body providing a connective threaded stub for the filter 60. After exiting the manifold through the bottom aperture to enter the in-line filter 60, the drain path 57 then reenters the manifold body through the hollow nipple and projects upwardly into the body into a pre-drain valve segment 69. About the midpoint of the body 31, the pre-drain valve segment terminates at an inlet of a two-position drain/bypass solenoid valve 70 which may be screwed into a threaded valve port 65 on the top side 33 of the manifold body 31 to position the dual outlet valve 70 in line with both the drain path 58 and recirculation path 80 of the fluid circuit 30. Such valve 70 includes a drain position, indicated by directional arrow 66, which directs fluid entering the inlet of the solenoid 70 out of a drain outlet of the solenoid 70 and through the remainder of the drain path 58 (FIGS. 6, 10) and a normally open bypass position, indicated by directional arrow 68, which directs fluid entering the inlet of the valve 70 out of an alternate outlet and through a recirculation path 80 (FIGS. 6, 8).

The valves described herein are preferably two-position, three-way magnetic solenoid valves, either size 8 or 10, which may be energized to enter into a number of alternative positions. Such valves are available from Hydac Technology Corporation in Bethlehem, Pa. Other suitable valving arrangements for directing fluid flow to or from multiple channels may also be used.

With continued reference to FIG. 10, the drain path 57 turns at a right angle from the longitudinal centerline of the solenoid 70 into a post-solenoid segment 72 forming the stem of a T-shaped intersection 74. Then the path is bifurcated to, in one branch, enter into a used fluid connection branch 75 of the T-shaped intersection leading to the drain port 36 which may be connected to the used fluid collection tank 40. Fluid entering the return port 34 from the serviceable component is thus normally directed along this drain path 57 if the drain/bypass solenoid 70 is energized to the drain position 66 for collection in the used fluid tank 40.

Referring now to FIGS. 6 and 8, when the drain/bypass valve 70 is energized to the bypass position as indicated by directional arrow 68, the recirculation path 80 is opened and the drain path 57 is blocked. The recirculation path 80 shares the same plumbing with the drain path 57 up to the drain/bypass solenoid 70 including the return port 34, pre-filter segment 64, filter 60, and pre-valve segment 69. Continuing through the drain/bypass solenoid valve 70, when energized to the bypass position 68, the recirculation passage 80 projects at a right angle to the longitudinal centerline of the solenoid to form an L-shaped recirculation loop leading to the exhaust port 32 which may be connected to the transmission inlet. Fluid entering the recirculation path from the return port 34 is directed through the solenoid 70 set in the bypass position 68 to exhaust port 32. Such recirculation path normally serves to circulate fluid in the direction indicated by arrow 59 between the serviceable component and the servicing apparatus and through the filter 60 while bypassing the pump 24, used fluid tank 40, and new fluid tank 42.

With continued reference to FIG. 6, and with particular reference to FIG. 11, the fresh fluid supply passage 93 is formed by an entry bore extending into the manifold body 31 from the new fluid supply port 38 to then turn at a right angle forming an L-shaped pre-supply valve segment 82. The segments discussed herein are preferably bored into the manifold body during manufacture. Such segment terminates at a two-position dump/supply solenoid valve 84 which is also screwed into a threaded port 85 on the top side 33 of the manifold body 31 to position the valve 84 in line with the new fluid supply passage 93 (FIG. 11) and the dump passage 95 (FIG. 9) in the fluid circuit 30. Such valve 84 includes a normally open supply position, indicated by directional arrow 81, which receives fluid withdrawn from the new fluid supply tank 42 and directs it through the remainder of the supply path 93 (FIG. 11). The supply/dump valve 84 also includes a dump position, indicated by directional arrow 83, which receives fluid being dumped from the used fluid tank 40 and directs such fluid on through the remaining portion of the new fluid supply passage as well (FIG. 9).

Continuing with the new fluid passage 93, a pre-suction port segment 86 projects at a right angle to the longitudinal centerline of the solenoid 84 and further includes a second right angle turn leading to the suction port 50 (FIGS. 6 and 11). The suction side hose 54 connects the suction port to the suction side of the pump 24 and a pressure side hose 56 connects the pressure side of the pump 24 with the pressure port 52 at the top side 33 of the manifold body 31 to position the pump 24 in line with the supply path 93 (FIG. 11) and also the dump path 95 (FIG. 9) depending on the valve 84 position. Reentering the manifold body 31 through the pressure port, the new fluid supply passage 93 projects downwardly through a pre-supply filter segment 87 to lead to an aperture (not shown) on the bottom side of the manifold body 31 aligned with an entry hole in a supply filter 88. The supply filter 88 is also connected to the manifold body via a hollow, threaded nipple 90 on the under side 35 (FIG. 12) similar to the drain filter 60 connection. Exiting the filter 88 through the hollow nipple 90, the new fluid supply path 93 projects upwardly into the manifold body 31 through an in-line one-way check valve 92 and then turns outwardly toward the back side 37 of the manifold body in an L-shaped segment 94 leading to the exhaust port 32 which may be connected to the transmission inlet or collection tank via servicing hose 46. The final segment 94 of the new fluid supply path 93 leading to the exhaust port 32 is common with the last segment of the recirculation path 80.

The check valve 92 is incorporated in the supply fluid circuit 93 to prevent fluid from backflowing or otherwise entering the outlet of the supply filter 88 from the recirculation path. This feature also serves to keep the pump 24 primed in use. However, it is preferable to select a suitable pump 24 having an integrated check valve for incorporation into the servicing apparatus 20 so that the external check valve 92 can be omitted altogether. The supply pathway 93 normally serves to conduct fluid in the direction of arrow 61 from the fresh fluid supply 42 connected to the new fluid port 38 and direct the fluid to the exhaust port 32 and to the upstream line of the serviceable component via servicing hose 46 to supply fresh fluid thereto. Alternatively, such passage 93 can be used to drain the new fluid tank 42 when the servicing hose 46 is coupled to a collection tank.

Turning now to FIGS. 6 and 9, the fluid circuit 30 also includes the used fluid dump pathway 95 for transporting fluid in the direction of arrow 63 between the drain port 36 and the exhaust port 32 for draining fluid from the used fluid tank 40 using the common pump 24. With continued reference to FIG. 9, the dump path 95 begins with at the drain port 36 which is normally coupled to the used fluid collection tank 40 via the used fluid conduit 39. The dump path 95 is then formed with a bore projecting inwardly from the drain port 36 along a straight segment to form the first branch 75 of the T-intersection 74. The path 95 bifurcates at intersection 74 to flow through to a straight pre-valve segment 91 to one inlet of the dual inlet dump/supply solenoid valve 84 which controls the flow on to the outlet bore 86 (pre-suction port segment) leading to the suction port 50 when the valve is energized to the dump position 83. The remaining portion of the dump path is common to the new fluid supply path 93 as it exits the solenoid 84 ultimately leading to the exhaust port 32 including passage through the outlet bore 86 through the suction port 50 to the inlet of the pump 24 via coupling 54. The fluid is then directed through the outlet of the pump 24 through coupling 56 to pressure port 52 on through filter 88, check valve 92 to exhaust port 32. Such path 95 normally serves to direct fluid withdrawn from the used fluid collection tank 40 in the direction of arrow 63 using the common pump 24 to direct used fluid through the exhaust port 32. Instead of connecting the service hose 46 to the transmission, however, the free end of the service hose is typically placed in a waste fluid receptacle (not shown) for future storage so that the used fluid tank 40 may be drained.

With continued reference to FIGS. 6 and 8–11, fluid typically enters the return port 34 from conduit 44 connected to the downstream port of the transmission and exits the exhaust port 32 to be directed through hose 46 to the upstream port of the transmission. Fluid is generally circulated through the fluid circuit 30 by the single, non-reversible pump 24 interposed in the supply and dump pathways 93 and 95, respectively, to complete these pathways. Fluid may also be circulated by a pump associated with the serviceable component through the drain and recirculation paths 57 and 80, respectively. Direction of the fluid through the fluid circuit 30 is normally determined by the respective positions of the single inlet, dual outlet, drain/ bypass valve 70 and dual inlet, single outlet, dump/supply valve 84. The drain/bypass valve 70 operates to direct fluid entering the return port 34 through the drain or bypass passages 57 and 80 respectively with one side of the valve 70 in fluid communication with the return port 34 and the second side in fluid communication with the drain port 36 and exhaust port 34. When solenoid 70 enters into the drain position 66, the bypass passage 80 is blocked off and the passage between the return port 34 and the drain port 36 is open and fluid may flow in the direction of arrow 58 (FIG. 10). On the other hand, when the valve 70 is energized to the bypass position 68, the drain passage 57 is blocked off and the passage between the return port 34 and the exhaust port 32 is open establishing a bypass loop 80 wherein fluid may circulate in the direction of the arrow 59 and wherein fluid does not circulate through the pump 24 (FIG. 8).

Referring to FIGS. 6, 9, and 11, connected in fluid communication with the supply and dump paths 93 and 95, respectively, is the dump/supply valve 84 with the outlet of the valve in fluid communication with the exhaust port 32 and the dual inlet in fluid communication with the drain port 36 and new fluid supply port 38. When the valve 84 is energized to the supply position 81, the dump passage 95 is blocked off and the passage 93 between the new fluid supply port 38 and the exhaust port 32 is open so that fluid may flow in the direction of arrow 61 (FIG. 11). On the other hand, when the valve 84 is energized to the dump position 83, the new fluid supply passage 93 is blocked off and the passage between the drain port 36 and the exhaust port 32 is open establishing a passage 95 for dumping fluid in a direction indicated by arrow 63 to be collected in the used fluid tank 40 by withdrawing such fluid with the common pump 24 (FIG. 9). Selection of these valve positions 66, 68, 81, and 83 is directed by the controller 28 and the operator or service technician using the electrical command system as will now be described.

Electrical Command Subsystem

Referring now to FIGS. 1–3, and 6, the heart of the electrical command sub-system is the controller 28 which is a programmable circuit board having a central processing unit (CPU) and associated memory for transmitting control commands to the pump 24 or valves 70, 84 in accordance with command sequences stored in the memory responsive to feedback transmitted from a number of sensors to direct the fluid service operations selected by a service technician. In this exemplary embodiment, there are three such sensors.

With particular reference to FIG. 6, the controller 28 is connected to a new fluid tank sensor 100 and a used fluid tank sensor 102 through their respective electrical leads 104 and 106 to provide fluid level feedback for each tank, 42 and 40, respectively. The fluid level sensors detect the fluid level in their respective fluid tanks and provide this information to the controller which includes tank geometric data and fluid density data in its memory for calculating the volume of fluid in each tank. Such fluid level sensors are preferably gas sensors, available from Motorola and constructed to monitor the air pressure in each tank. A two-port balancer system is used so that the sensors can detect outside air pressure and take into account elevation of the servicing apparatus to provide more accurate fluid level readings thereby compensating for discrepancies between sea level readings and readings taken at other altitudes.

The controller 28 is also in electrical communication with a pressure sensor 108 through electrical lead 110. Such pressure sensor 108 is threaded into an aperture 109 on the top surface of the manifold body 31 and is used for sensing fluid pressure in the last segment 94 of the fluid circuit leading to the exhaust port 32 and providing feedback to the controller 28 and is primarily used to detect incorrect service hose connections during the drain procedure as will be discussed below.

With continued reference to FIG. 6, the pump 24, drain/bypass valve 70, and dump/supply valve 84 are in electrical communication with the controller 28 via their respective electrical connectors 112, 114, and 116. Using feedback from the sensors and any additional operator input, the controller energizes the first and second valves 70 and 84 to the desired positions as will be described below and further actuates the pump 24 to on and off states during selected servicing procedures to circulate the fluid through the fluid circuit 30 from the desired source to the selected destination. Conveniently, the controller 28, a control panel 130, valves 70 and 84, pump 24, and sensors 100, 102, and 108 are in electrical communication with a set of battery cables 120 (FIG. 1). Thus, power may be supplied to such components capable of being powered by a 12 volt DC source by attaching a set of battery cables 120 to the vehicle's battery. It will be appreciated that such electrically powered components could also be hardwired to an alternative power source located on the servicing apparatus itself 20 or constricted to plug into a wall outlet.

Figure 2:
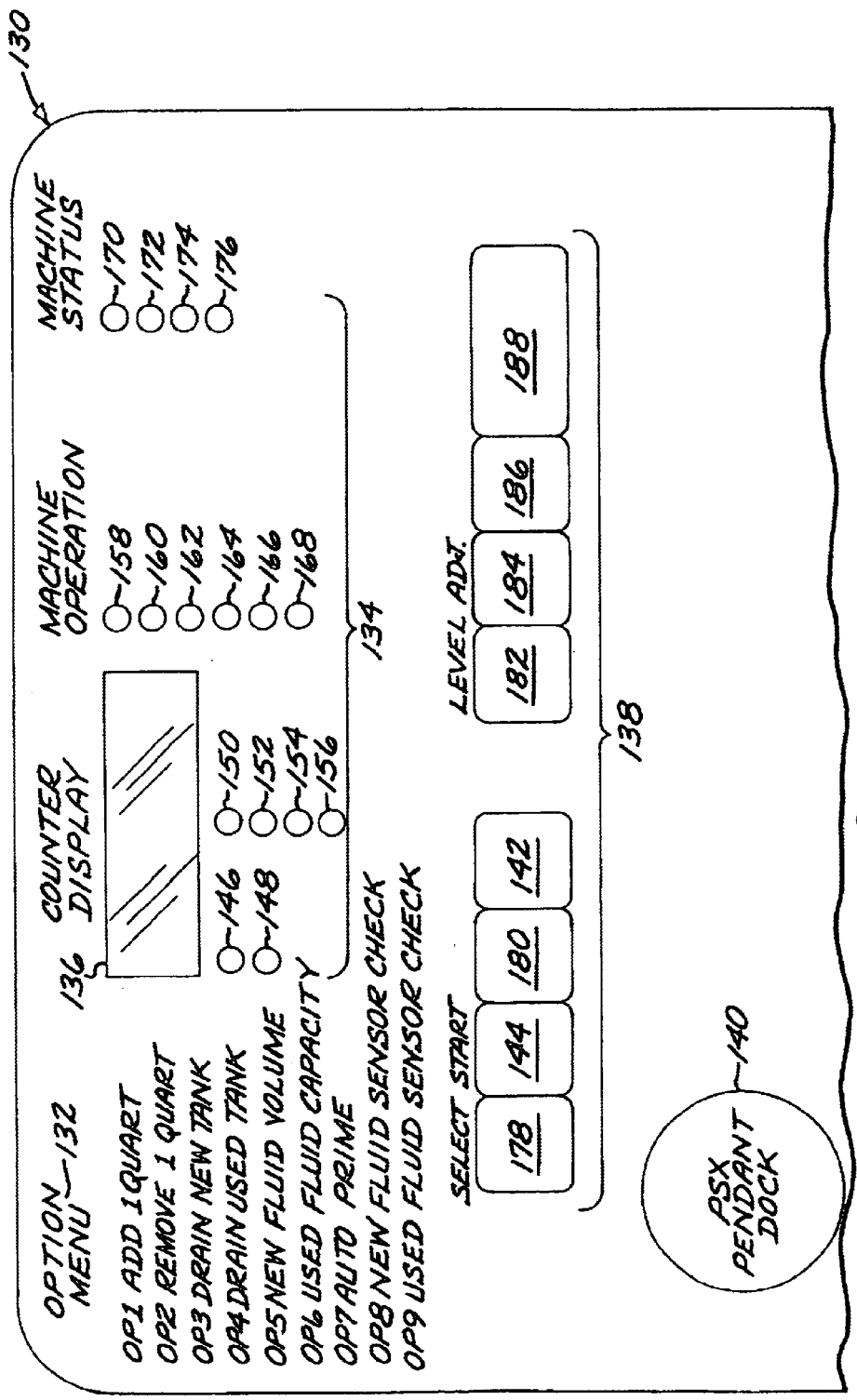
FIG. 2 illustrates an exemplary control panel, in enlarged scale, included in the automotive fluid servicing apparatus shown in FIG. 1.

Referring now to FIGS. 1 and 2, in this exemplary embodiment, an operator may interface with the controller 28 via a control panel 130 located on a top forward inclined surface of the cabinet 22. Such control panel is generally divided into four regions including an options menu listing 132 presenting the available operational options, a display region 134 with a plurality of LEDs and a counter display 136 for indicating machine and operational status and displaying quantity or diagnostic information, an interactive control region 138 and a power steering exchange (PSX) pendant dock region 140 for attaching a remote control for controlling power steering fluid exchange operations which will be described in detail below.

With continued reference to FIG. 2, the options menu listing 132 positioned to the left side of the control panel 130 includes a listing of procedural options 1–9, respectfully indicated as OP1–OP9 as imprinted or otherwise provided on the face of the control panel (FIG. 2). The exemplary options are as follows:

OP1 Add 1 quart of fluid;
OP2 Remove 1 quart of fluid;
OP3 Drain new fluid tank;
OP4 Drain used fluid tank;
OP5 Access new fluid volume;
OP6 Access used fluid capacity;
OP7 Auto prime the system;
OP8 New fluid sensor check; and
OP9 Used fluid sensor check.

Such exemplary options, as illustrated in FIG. 2, are accessible via an options menu button 142 in the control region 138 and engageable by a start exchange/options button 144 as will be described below. The display region 134 provides visual feedback to the operator as to the status of the fluid exchange procedures and servicing apparatus 20 operation. The primary indicator is the counter display 136 which provides a visual display of requested information such as the servicing option being invoked, fluid capacities, or other information in the form of alphanumeric messages.

Continuing with FIG. 2, further comprising the display region 134 are a number of LED indicators divided into four columns. The first column includes a quarts LED indicator 146 and a liters LED indicator 148. Such indicators indicate the system of measurement being used. Next to the first column is a column of amount indicators including a 20 quart indicator 150, a 16 quart indicator 152, a 12 quart indicator 154, and a 4 quart indicator 156. Each of these indicators provides a display to the operator as to the amount of fluid selected by the operator for an exchange. For purposes of an automatic transmission fluid exchange, eight cylinder, full size vehicles or truck typically require a twenty quart exchange. Mid-size vehicles with 6-cylinders typically require a sixteen quart fluid exchange and compact, four cylinder vehicles typically require a twelve quart exchange. Sub-compact vehicles typically only require a four quart exchange.

Still referring to FIG. 2, the third column in the display region 134 indicates machine operation status and includes a stopped indicator 158, a halted indicator 160, a running indicator 162, a complete indicator 164, a switch hoses indicator 166, and a shift to neutral indicator 168. A machine status column is the fourth column in the display region 134. Such machine status column includes a new ATF low indicator 170, a used ATF full indicator 172, an add/remove ATF indicator 174, and a new/used ATF drain indicator 176. The meaning of these indicators will be discussed below when the operation of the servicing apparatus is described.

Spaced below the display region 134 in the control region 138 is a first and second set of depressable buttons for initiating a variety of functions to operate the servicing apparatus 10 (FIG. 2). The leftmost button of the first set is a quantity button 178 for selecting the quantity of fluid to be transferred from one location to another. Depressing this button cycles through the quantity indicators 150, 152, 154, and 156. Next to the quantity button is positioned the exchange/options button 144 for initiating a fluid exchange or initiating the option selected by the options menu button 142. A power steering button 180 for initiating a power steering fluid exchange is next in line followed by the option menu button 142. The options menu button cycles through the options listed in the options menu 132 when depressed.

The leftmost button in the right hand set of buttons is an add ATF button 182 for adding automatic transmission fluid where directed by the fluid circuit 30. Next to the add ATF button is a remove ATF button 184. Selection of this button may be used to remove or drain ATF from the selected source. The third button is a cycle sensors button 186 for cycling the valves 70, 84 between their respective positions to clear the valves prior to operation of the servicing apparatus 20 to ensure the valves are in proper working order. The last button is a stop button 188 for shutting the apparatus down completely in an emergency or other desired stop condition. Such button is preferably a larger size or otherwise stands out from the other buttons so it may be rapidly located by the operator. An illustrative servicing procedure using the above-described plumbing and electrical subsystems incorporated into a servicing apparatus 20 will now be described.

Operation of the Fluid Servicing Apparatus

In the field, the manifold assembly 26 is typically secured within an internal compartment of the servicing apparatus 20 using a suitable threaded fasteners screwed into a pair of mounting bores 194 on the front side 43 of the manifold body 31 (FIGS. 1 and 12) and comes preassembled. Such internal compartment is accessible via a removable servicing panel 190. The pump 24 is also preferably secured inside the servicing apparatus. The control panel 130 is also removable and may provide an alternative access into the compartment. Near the bottom of the servicing apparatus, the used and new fluid tanks 40 and 42, respectively are placed on a convenient shelf.

While the servicing apparatus 20 is typically assembled prior to operation of the servicing apparatus 20, it will be appreciated that the integrated manifold assembly 26 has been designed to reduce assembly time and facilitate servicing in the field and that some connection may be required prior to initiating servicing procedures or during maintenance.

Referring now to FIGS. 3, 6, and 12, starting with the basic manifold body 31 with preformed fluid circuit 30 and built-in couplings threaded into the ports 32, 34, 36, 38, 50 and 52, the operator may connect the used fluid conduit 39 by pressing one end into the drain port 36 and the other end is inserted into or otherwise coupled to the used fluid tank 40. The supply conduit 41 is likewise coupled between the supply port 38 and the new fluid tank 42. The pump 24 may then be connected to the top side 33 of the manifold body by pressing in one end of the suction hose 54 into the suction port 50 and its opposite end into the suction side inlet of the pump 24. Similarly, one end of the pressure side hose 56 is pressed into the pressure port 52 its other end into the pressure side outlet of the pump 24.

With continued reference to FIG. 12, the connector nipples of the valves, pressure sensor, and filter components may then be screwed into their respective threaded ports on the manifold body 31. More specifically, the drain/bypass valve 70 is threaded into the port 65 to place the valve inline with the drain and bypass fluid paths, 57 and 80 respectively. The inlet of the valve 70 is aligned with the terminal end of the pre-filter bore 34. The first outlet of the valve 70 corresponding to position 66 is aligned with the inlet to bore 72 and the second outlet of the drain/bypass valve 70 corresponding to position 68 is aligned with the inlet to the recirculation loop 80. Likewise, the dump/supply valve 84 is screwed into threaded port 85 on the upper side 33 of the manifold body to place such valve in fluid communication with the supply and dump paths, 93 and 95 respectively. The first inlet of valve 84 corresponding to position 81 is aligned with the exit of pre-valve bore 82 and the second inlet of valve 84 corresponding to position 83 is aligned with the exit to bore 91. The outlet of valve 84 is aligned with the entrance to post-valve bore 86. The nipple of the pressure switch 108 is also threaded into its respective threaded aperture 109 on the top side 33. On the bottom side 35 of the manifold body 31, the filters 60 and 88 are screwed onto their respective nipples 67 and 90 until their respective gaskets are flush with the undersurface of the manifold providing a suitable seal. The entry port of the drain filter 60 aligns with the aperture occurring at the end of the pre-drain bore 34. The entry port of the supply filter 88 aligns with the aperture occurring at the end pre-supply filter bore 87. The filters are preferably of the ten micron absolute variety and the threaded nipples are preferably constructed using metric threads to inhibit a service technician from bypassing the filters. Such filters also act as maintenance indicators as fluid servicing procedures will take longer as the filters become more and more clogged obstructing fluid flow.

Each of the electrical leads of the pump 24, valves, 70, 84, and sensor 108 along with the other DC powered components may then be placed in electrical communication with the controller 28 and battery cables 120 via the wiring harness.

When the service technician is prepared to service an automobile transmission, with reference to FIGS. 1–3, and 6, the new fluid tank 42 and used fluid tank 40 may initially be empty. The servicing apparatus 20 is initially prepped for servicing by filling a quantity of new transmission fluid through a fill hole (not shown) into the new fluid tank 42. For purposes of this operational procedure, it will be assumed that the used fluid tank 40 is initially empty and the new tank 42 has an adequate supply of transmission fluid to perform a complete exchange. The servicing apparatus 20 is wheeled over near the transmission to be serviced. Using well known procedures, the service technician interrupts the transmission cooling lines to expose an influent line or inlet port and an effluent line or outlet port and connects the free ends to the return and exhaust ports 34 and 32 of the manifold assembly 26 using the service hoses 44 and 46 using conventional adapters if necessary. Preferably, the technician connects the effluent line of the transmission to the return port 34 and further connects the influent line at one end to the exhaust port 32 such that the connection places the transmission in fluid communication with the fluid passages 57, 80, 93, and 95 of the servicing apparatus 20 (FIGS. 1, 6, and 8–11). It will be appreciated that the service hoses 44, 46 are preferably clear allowing an operator to visually check the condition of the fluid in each hose. The default position of the drain/bypass valve 70 is the bypass position 68 blocking off the drain path 57 so that fluid flow from the transmission will circulate through fluid passage 80 in the direction of arrow 59 initially when the vehicle engine is turned on to activate the transmission pump (FIG. 8).

With continued reference to FIGS. 6 and 8, once the service hoses 44, 46 are connected, the technician may then connect battery cables 120 to the vehicle battery to supply power to the control panel 130, controller 28, drain/bypass valve 70, dump/supply valve 84, pump 24, sensors 100, 102, 108, all of which are preferably selected to run on a 12-volt DC power supply. Using the versatile servicing apparatus 20, the technician may perform several servicing procedures including circulation and clean, automatic transmission fluid exchange by draining and refilling the transmission in incremental steps, draining and refilling the transmission pan, topping off fluid levels, and draining the new and used fluid tanks. It will be appreciated that the following procedures are performed using only a single common pump 24 operating in conjunction with the vehicle transmission pump for some procedures.

In the initial stage after the service hoses 44 and 46 are connected to the return and exhaust ports 34 and 32 and transmission cooling lines, the operator may press the cycle sensors button 186 to actuate the valves 70 and 84 through their full range of movement to clear any obstacles, debris, or other contaminants that may prevent performance.

With battery cables 120 connected, the operator may start the vehicle engine to operate the transmission pump and to pressurize fluid out of the transmission to begin circulating fluid through circulation passage 80. This is commonly referred to as circulation mode during which the pressure switch 108 in normally inactive. Depending on the transmission pump and direction of fluid flow, used fluid from the transmission is forced out into the recirculation passage 80 from either the return port 34 or the exhaust port 32. Fluid will either flow in the direction of arrow 59 or in a reverse direction. The fluid exits the recirculation passage 80 from the opposite port wherein fluid is entering and reenters the transmission through the associated servicing hose. The check valve 92 prevents the used fluid from entering the servicing apparatus pump 24. At this point a closed circulation loop between the vehicle transmission cooling lines and servicing apparatus 20 is established and the running indicator 162 lights up on the control panel 130. It will be appreciated that the used transmission fluid is directed through the filter 60 to remove particulate from the used fluid during this initial procedure.

While the fluid is circulating, the operator may then select the quantity of fluid to be changed via the control board 130 connected to the processor/controller 28 by depressing the quantity button 178 until the indicator 150, 152, 154, or 156 beside the desired quantity illuminates (FIG. 2). Assuming for example, a full-sized 8-cylinder vehicle is being serviced, the operator selects the 20 quart quantity by toggling the quantity button until the desired indicator lights up. In this instance, the 20 quart indicator 150 will light up on the control panel. At this point, the pump 24 is not running and fluid is only being circulated by the transmission pump.

Turning now to FIGS. 2, 6, 8, and 10, having selected the quantity to be exchanged, the operator presses the start exchange/options button 144 on the control panel 130 of the servicing apparatus 20, which causes several actions to occur. Initially, the controller 28 energizes the drain/bypass solenoid 70 to move from the bypass position 68 to the drain position 66 to block off the recirculation passage 80 and open the drain path 57. If the service hoses have been connected properly, used fluid entering the return port 34 under pressure from the transmission pump is directed through the drain path 57, along the direction of arrow 58, through the drain port 36 and used fluid conduit 39 connected thereto to be collected in the used fluid collection tank 40. Once the valve 70 is energized to the drain position 66, the controller 28 will take a reading of the used fluid tank sensor 102 to sense the hydrostatic pressure head therein (FIG. 6). If no fluid is sensed in the used fluid tank 40, the controller will also take a reading of the signal transmitted from the pressure sensor 108 to determine if any fluid is entering the exhaust port 32 and is present in segment 94. With the signal stored showing no fluid in the used fluid tank, detection of fluid entering through the exhaust port 32 into the recirculation passage 80 is indicative of an improper hose connection. If that's the case, the processor 28 acts accordingly to alert the operator of an improper hose coupling condition by transmitting a signal to illuminate the switch hoses indicator 166 on the control board 130. It will be appreciated that an audible alarm may be programmed into the controller 28 to accompany this display or any of the displays to further alert the operator. The operator may then turn the vehicle engine off and manually switch the service hoses 44 and 46 between the respective ports 32 and 34. Once the hoses are switched the operator restores the servicing apparatus 20 to circulation mode as described above.

On the other hand, if a no pressure signal is transmitted by the pressure switch 108 to the processor after the drain process is initiated and no fluid is detected by the sensor 102 in the used fluid tank 40, the shift to neutral indicator 168 is illuminated. This occurrence may be due to the fact that, for instance, many Chrysler transmissions pump fluid only when in neutral. If the switch hoses indicator 166 and the shift to neutral indicator 168 have not lit, then the hoses are connected properly and proper fluid flow has been established. The transmission may then be serviced.

Assuming these error conditions do not occur, when the start button 144 is pressed the transmission pump will force the fluid from the return port 34 through the filter 60 into the drain passage 57 and through the solenoid valve 70 set in the drain position 66 (FIGS. 6 and 10). Used fluid passing through the solenoid 70 is directed to the drain port 36 in the direction of arrow 58 and expelled into the used fluid tank 40. The level sensor 102 in the used fluid tank transmits a signal proportional to the level of the fluid entering into the used fluid tank to the processor 28 by sensing the hydrostatic pressure head of the fluid entering the used fluid tank. The pressure head data is used to calculate the volume of fluid in the used fluid tank as the known parameters of the tank geometry and fluid density stored in the processor are recalled by a volume calculation routine. In this exemplary embodiment, once $6/10$ of a quart is collected in the used fluid tank 40 as calculated by the processor 28, the processor will energize the drain/bypass solenoid 70 to reenter the bypass position 68 blocking off the drain passage 57 and forcing the fluid into the recirculation passage 80 in the direction of the arrow 59. Other predetermined quantities could also be used. The processor 28 then initiates an incremental fill mode.

Turning now to FIGS. 2, 6, and 11, to perform the incremental fill portion of the process, the processor 28 will actuate the dump/supply solenoid 84 to cause it to assume the supply position 81 to open the new fluid supply path 93 from the new fluid tank 42 through the servicing apparatus pump 24 to the exhaust port 32 to the transmission via servicing hose 46. The processor also actuates the pump 24 at this time withdrawing fluid from the new fluid tank 42 in the direction of arrow 61 and through the suction port 50 and suction hose 54 to the pump. Fresh fluid is then pumped out of the pump through the pressure hose 56 to pressure port 52. Such fresh fluid is directed under pressure through the supply filter 88 and one-way check valve 92 and, because it can not enter the drain/bypass solenoid 70 due to incoming fluid pressure, is directed through the exhaust port 32 to the vehicle's transmission via service hose 46. When the level in the new fluid tank is lowered an amount corresponding with $6/10$ of a quart, the level sensor 100 will transmit a signal to the processor 28 which is programmed to respond to shut off the internal pump 24 and then shift the drain/bypass solenoid 70 back into the drain position 66 to repeat the incremental drain procedure.

This drain then fill process continues in an alternating, iterative manner as the processor 28 periodically responds to discrete drops in the level of fluid sensed by the fluid sensor 100 in the new fluid tank. When the quantity of the new fluid transferred out of the new fluid tank equals the preselected quantity initially set by the operator, and indicated by one of the quantity indicators 150, 152, 154, or 156, the processor will energize an exchange complete indicator 164 on the control board 130 and actuate an audible signal (FIG. 2). The processor 28 then shifts the drain/bypass solenoid 70 to the bypass position 68 to switch the servicing apparatus 20 to the recirculation mode and circulates fluid through the recirculation passage 80. As before, during recirculation mode, the internal pump 24 is deactivated.

In this exemplary procedure, the processor is operative to, in discrete $6/10$ quart increments, transfer a total of 20 quarts of fluid to the used fluid tank 40 and an equal volume of new fluid is withdrawn from the new fluid tank 42. Responsive to the exchange complete indicator, the operator will turn the engine off and disconnect the service hoses 44, 46 from the servicing apparatus 20. The operator will then reconnect the vehicle transmission cooling loop to complete the servicing procedure. It will be appreciated that upon the operator depressing the start button 144, the entire fluid exchange procedure will be performed automatically without further operator intervention until he or she turns the engine off and reconnects the transmission cooling lines, assuming no error in connection was detected. In addition, to prevent an overpressure condition during fluid exchange or other servicing procedures, a pressure relief valve (not shown) may be placed in communication with the fluid circuit 30 and set to relieve in response to a preselected pressure to route overpressurized fluid through a bypass. It will be appreciated that the alternating drain and fill exchange process takes place rapidly and an entire exchange for an eight cylinder vehicle can take place in approximately 10–15 minutes.

Such fluid exchange will typically leave the new fluid tank 42 empty or partially empty and the used fluid tank 40 partially full or completely full depending on the tank capacity. Should the operator then attempt to start another servicing procedure and select an exchange quantity that exceeds the amount of fluid remaining in the new fluid tank 40, the processor 28, having taken a reading of the new fluid sensor 100, will transmit a signal to the control board 130 to illuminate the new ATF low indicator 170 to alert the operator that there is insufficient fluid in the new fluid tank 42 to perform the selected procedure (FIGS. 2 and 6). To refill the new fluid tank 42, the operator may supply new fluid through its fill hole. During this procedure, the processor functions to illuminate the Add/Remove ATF indicator 174 alerting the operator that fluid is being added to the new fluid tank 42.

On the other hand, should the operator select an exchange quantity that would overflow the capacity of the used fluid tank 40, the processor, having taken a reading of the used fluid sensor 102, will transmit a signal to the control board 130 to illuminate the used AFT full indicator 172 alerting the operator to drain the used fluid tank before proceeding. Conveniently, the fluid circuit 30 and common pump 24 enable such draining or dumping of the used fluid tank 40 without the assistance of a dedicated drain pump.

Referring now to FIGS. 1, 2, and 9, to initiate the used fluid dump procedure, the operator will connect one end of the servicing conduit 46 to the exhaust port 32 and place the free end of the servicing conduit into a fluid waste tank (not shown). The operator will then depress the options button 142 on the control panel 130 to scroll through the options menu (OP1–OP9) until the desired option is displayed in the counter display 136. In this scenario, the OP4 option code would be displayed in the counter display 136 indicating that the operator has elected to drain the used fluid tank. Conveniently, the operator may refer to the option menu 132 imprinted on the left side of control panel 130 to determine the procedure associated with the option code. Next, the operator may engage the start button 144 to begin the used fluid dumping procedure. In response to the operator's command, the controller 28 energizes the dump/supply valve 84 to its dump position 83 to open the dump passage 95 and then actuates the pump 24 to begin drawing fluid from the used fluid tank 40 through the open dump passage in the direction of arrow 63. The fluid is expelled through the exhaust port 32 through the servicing conduit 46 and into the storage receptacle. Once the controller 28 detects the used fluid tank is at a predetermined bottom operating level via the used fluid level sensor 102, the controller will shut the pump 24 off and terminate the procedure. By pressing the start button 144 for five seconds the operator can effect draining of the used fluid collection tank 40 until the stop button 188 is pressed. An audible alarm sounds when the used fluid tank level is empty as sensed by the used fluid sensor 102 and illumination of the complete indicator 164 on the control panel 130 alerts the operator that the dump procedure is completed. It will be appreciated that the plumbing circuit of the exemplary embodiment enables draining of the used fluid tank without the necessity of inverting the tank upside down to drain from its top end or incorporating an extra dedicated drain pump to draw the used fluid from the used fluid tank and direct it to a waste fluid collection receptacle.

In a similar manner, the new fluid tank 42 may also be drained completely as desired. Referring now to FIGS. 1, 2, 6, and 11, as described for the used fluid tank 40 dumping procedure, one end of the servicing conduit 46 may be connected to the exhaust port 32 and its free end placed into a new fluid storage receptacle (not shown). In this scenario, the operator may toggle the options button 142 until OP3 is displayed in the display counter 136. Activation of the exchange/options button 144 will cause, the controller 28 to shift the dump/supply valve 84 to its supply position 81. The pump 24 is also actuated and fluid is drawn from the new fluid tank 42 along the supply passage 93 in the direction of arrow 61 to be expelled through the exhaust port 32. The expelled fluid is transferred through the servicing hose 46 to the new fluid receptacle for storage. The processor 28 is responsive to the sensor 100, sensing that the fluid level in the new fluid tank has fallen to a predetermined bottom operating level to shut the pump 24 off and terminate the drain new fluid procedure. The operator may then press and hold the start button 144 for five seconds to initiate a full drain of the new fluid tank 42 until the stop button 188 is pressed. An audible alarm sounds when the new fluid tank level is empty as sensed by the new fluid sensor 100 and the complete indicator 164 is illuminated by the processor on the control board 130 (FIG. 2).

Turning now to FIGS. 2 and 6, it will be appreciated that the operator may check the new fluid volume and used fluid capacity as calculated by the controller 28. To display the new fluid volume in the new fluid tank 42, the operator may depress the options button 142 and scroll through the options menu until OP5 is displayed in the counter display 136. The operator may then simply depress the start exchange/options button 144 and the new fluid level sensor 100 sends a signal to the controller 28 which processes the signal and displays the new fluid level in the counter display 136 in the measurement selected (quarts or liters). Likewise, to check the remaining capacity in the used fluid tank 40, the operator may select OP6 using the options menu button 142 and then depress the start button 144. The used fluid level sensor 102 will detect the used fluid level in the used fluid tank 40 and transmit the corresponding signal to the controller 28. The signal is processed and the remaining capacity is calculated and displayed on the counter display 136. These features may be used by the operator prior to initiating a servicing sequence or in response to an indicator light from the control panel concerning fluid levels or any other time as selected by the operator.

With continued reference to FIGS. 1 and 6, prior to beginning a servicing sequence, the operator may desire to auto prime the servicing apparatus 20. This feature is used to purge air out of the system. Preferably, at least six quarts of new fluid must be present in the new fluid tank 42 to initiate this procedure. After ensuring the proper fluid level in the new fluid tank, the operator connects one end of each servicing hose 44 and 46 to the respective return and exhaust ports 34, 32 and connects the free ends of the hoses together with a priming hose (not shown) to complete the circulation loop. The operator then selects OP7 by toggling the options menu button 142 and then depresses the start button 144. During the auto prime procedure, the controller 28 will actuate the pump 24 to begin drawing fluid from the new-fluid tank 42 through the supply path 93 and expelling fluid through the exhaust port 32. The expelled fluid is transferred through the servicing hoses 46 and 44 and interconnecting priming hose (not shown) to the return port 34. During this fluid transfer, the controller 28 cycles the drain/bypass valve 70 between first and second positions 66 and 68, respectively to build up bursts of pressure to purge unwanted air in the servicing apparatus 20. Once three quarts of fluid have been transferred to the used fluid tank 40, the procedure is terminated by the controller 28. Such procedure is typically initiated prior to a fluid exchange.

Referring now to FIG. 2 and 6, another set of features engageable through the control panel 130 include filling the and draining transmission pan without removing the pan. In order to perform a quick fill of the transmission pan, the servicing hose 46 is connected between the exhaust port 32 and an interrupted influent cooling line or filling port of the transmission. The operator may then select OP1 using the options menu button 142 and depress the start button 144 to initiate the process. The controller 28 energizes the dump/supply valve 84 to the supply position 81 and actuates the pump 24 to transfer fluid from the new fluid tank 42 in a one quart increment to the transmission (FIG. 11).

To drain the transmission pan, the servicing hose 44 is connected between the return port 34 and an interrupted effluent transmission cooling line or outlet. OP2 is selected by the operator using the options menu button 142 and the operator may then depress the start button 144. Drain/bypass valve 70 is energized by the controller 28 to drain position 66 establishing an open drain path 57 (FIG. 10). The operator may then turn the vehicle ignition on to start the transmission pump forcing fluid out through the transmission effluent line and into the return port 34 through the drain path 57, in the direction indicated by arrow 58, to be collected in the used fluid tank 40. Once a quart has been removed as detected by the used fluid level sensor 102 and determined by the processor 28, the complete indicator 164 on the control board illuminates alerting the operator to terminate the procedure.

Two other options may be used to check the new and used fluid sensors 100 and 102, respectively. To access the new fluid sensor check, the operator may access the options menu 132 by depressing the options menu button 142 until OP8 is displayed in the counter display 136. The operator then depresses the start exchange/options button 144. The new fluid level sensor 100 will transmit a signal to the controller 28 corresponding to the fluid volume in the new fluid tank 42. An absolute reading, which is typically between 300 and 4096 fluid units, will be displayed on the display counter 136. The start button 144 is then depressed again to zero the absolute reading. A measured quantity of new fluid such as one quart is poured into the new fluid tank 42 through the fill hole. A new reading corresponding to the amount of fluid poured into the new fluid tank is measured by the processor 28 via the new fluid sensor 102 and displayed on the counter display 136. For example, if one quart is added, the counter display 136 should read 78 fluid units. Any other reading indicates the sensor may need to be replaced or recalibrated.

A similar procedure may be used to check the used fluid level sensor 102. In this scenario, the operator selects OP9 in the display counter 136 using the options menu button 142 and depresses the start button 144. An absolute reading is displayed and then zeroed by depressing the start button 144 again. A known quantity of fluid is poured into the used fluid tank 40 which is measured by the used fluid level sensor 102 and displayed on the display counter 102. If the quantity displayed does not correspond to the amount poured in then the operator is alerted that the used fluid sensor may need to be replaced or recalibrated.

Another convenient feature programmed into the controller 28 is the totalizer. Such feature keeps track of the number of fluid units passing through the servicing apparatus 20. The total amount may be displayed in the display counter 136. As the display counter may only display a certain number of digits, a separate rollover counter is displayed indicating how many times the counter has reached its numerical limit. For example, if two digits were dedicated to the totalizer display, a display reading of "2" is displayed initially and is followed by a "78". Such display indicates the servicing apparatus has circulated 278 quarts of fluid. Advantageously, this feature enables the operator to develop a maintenance or replacement plan for the servicing apparatus 20 and its components. This feature is accessible through depressing the stop button 188 for approximately 5 seconds.

The capability for smaller increment level adjustments is also conveniently built into the servicing apparatus 20. For example, if during an exchange operation, the operator elects to top off the transmission fluid level with the hose 46 connected between the exhaust port 32 and the transmission influent line or inlet, the operator may depress the add ATF button 182 on the control panel 130 (FIG. 2). In response, the controller 28 commands the dump/supply valve 84 to the supply position 81 and further commands the pump 24 to actuate such that a predetermined amount of new fluid is transferred along the supply path to the transmission (FIG. 11). It has been found that about $2/10$ of a quart is a sufficient amount for such incremental fluid transfers although it will be appreciated that other suitable levels may be used. Once the predetermined amount has been removed from the new fluid tank 42, the controller 28 shuts the pump 24 off to terminate the transfer.

To withdraw a relatively small increment of used fluid from the transmission, the operator selects the remove ATF button 184 on the control panel 130 while the vehicle transmission is running and the hose 44 is connected between the return port 34 and the transmission effluent line or outlet (FIGS. 2 and 10). The controller 28 will then command the drain/bypass valve 70 to assume the drain position 66 such that used fluid is transferred from the transmission under the pressure of the transmission pump through the return port 34 to the used fluid tank 40 in the direction of arrow 58 through the drain path 57 upon turning the vehicle engine on. Once a $2/10$ of a quart or other predetermined increment is added to the used fluid tank 40, the controller 28 actuates the valve 70 to bypass position 68 to direct the fluid through the bypass/recirculation pathway 80.

It will be appreciated that the present embodiment is designed to detect reverse flow without harming the apparatus, transmission, or operator, and to prevent fluid exchange until the fluid flow is conducted in a direction wherein the effluent flow from the transmission passes into the return port 34 and the influent flow to the transmission comes from the exhaust port 32. While such features have been provided in the servicing apparatus 20 to minimize operator intervention and facilitate maintenance of the servicing apparatus and alert the operator to error conditions, as discussed above, it is contemplated that an operator may on occasion inadvertently couple the service hoses 44 and 46 between the transmission and servicing apparatus 20 incorrectly thus creating a reverse fluid circulation condition. While this may be adequately handled as described above with an alert to the operator, other ways of handling this condition are also contemplated by the present invention.

Cross Flow Operation

As discussed above, it is foreseeable that an operator may inadvertently connect the hoses 44 and 46 improperly and upon initiating an exchange procedure, a switch hoses indicator 166 would illuminate on the control board 130 to alert the operator to the error condition indicating that fluid is flowing in a direction opposite to direction of arrow 59. The operator may then turn the engine off and manually switch the hoses 44 and 46 by disconnecting and reconnecting them to the proper return and exhaust ports 34 and 32. The technician may then restart the vehicle and initiate the fluid exchange as described above.

Figure 7:
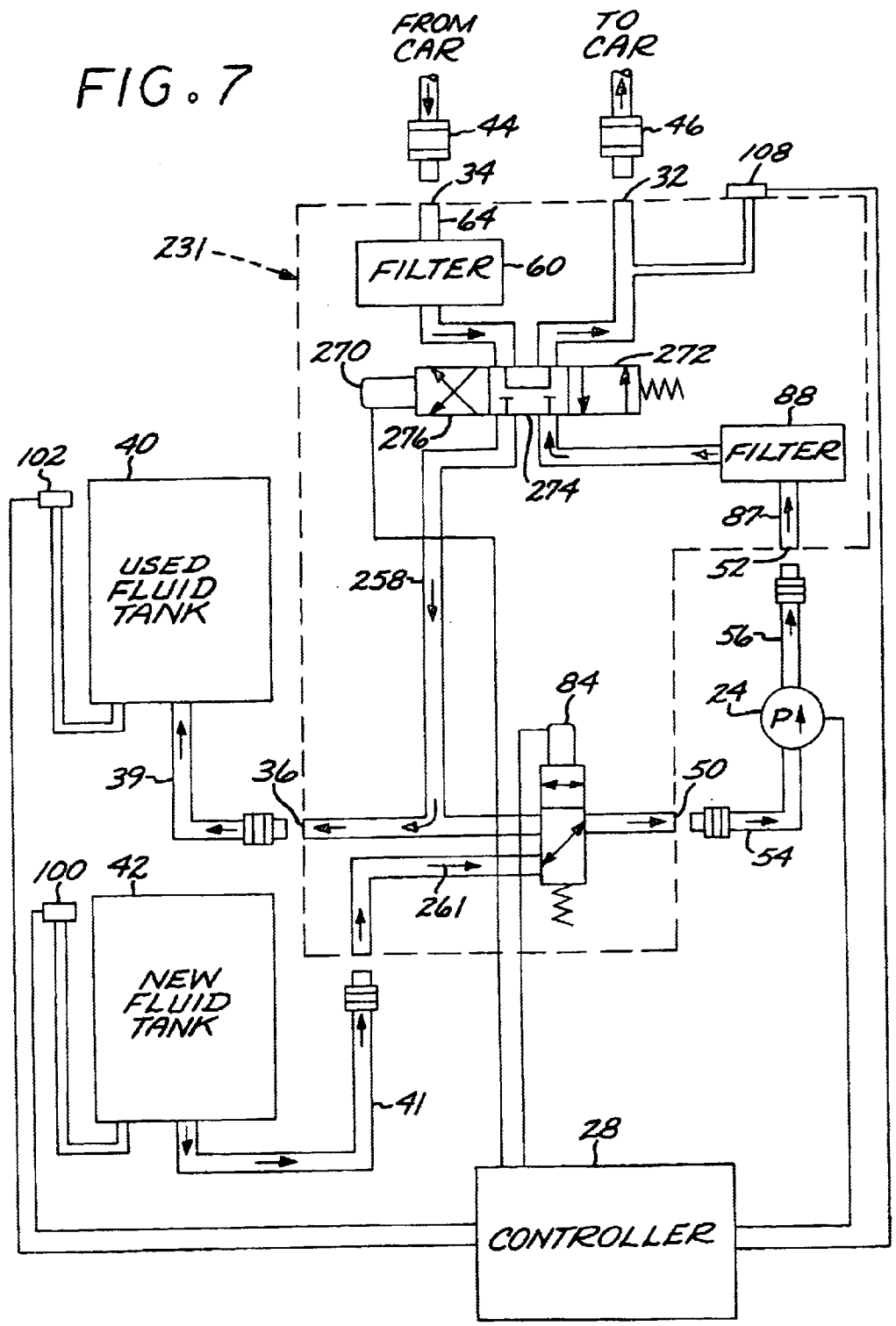
FIG. 7 is a schematic of an alternative plumbing circuit for performing servicing procedures in accordance with an alternative embodiment of the automotive fluid servicing apparatus of the present invention.

Referring now to FIG. 7, wherein like components are like numbered, a second exemplary embodiment of the present invention includes an alternative manifold body 231 for avoiding the necessity of manually switching the hoses 44 and 46. In general, this alternative embodiment is constructed the manner as the first manifold body 31 described above with the exception that an alternative valve 270 has been substituted in place of the drain/bypass valve 70 of the first embodiment. Such alternative valve 270 is preferably a 3-position, 4-way, magnetic solenoid valve with cross flow capabilities. The crossflow valve 270 includes a normal fluid exchange position, indicated by directional arrows 272, a bypass position, indicated by a U-shaped symbol 274, and a cross flow fluid exchange position, indicated by directional arrows 276.

With continued reference to FIG. 7, when energized to the normal fluid exchange position 272 by the processor 28, used fluid entering the return port 34 is transferred to the used fluid tank 40 and new fluid withdrawn from the new fluid tank 42 may be transferred to the exhaust port 32 in a manner similar to that described above in the first embodiment. This is effectively the same as the fluid exchange flow along the drain path 57 and supply path 93 as in the first embodiment as illustrated in FIGS. 6, 9, and 11.

If, however, the controller 28 energizes the alternative valve 270 to the bypass position 274, the servicing apparatus 20 is placed in a bypass/recirculation mode similar to the recirculation path 80 illustrated in FIG. 8. Thus fluid may be circulated between the transmission and servicing apparatus as described above with service hoses 44 and 46 connected between the return port 34, exhaust port 32 and transmission influent and effluent lines. Fluid being circulated during this mode may circulate in either direction as determined by the flow from the transmission.

Figure 13:
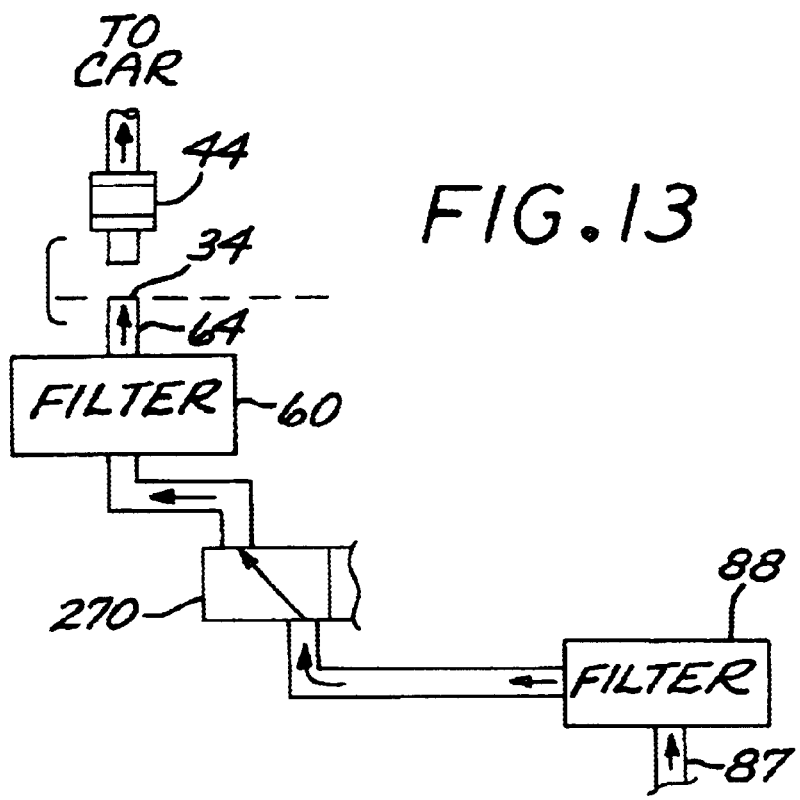
FIG. 13 is a partial sectional view taken from FIG. 7 illustrating a plumbing segment for accommodating a reverse hose flow configuration.
Figure 14:
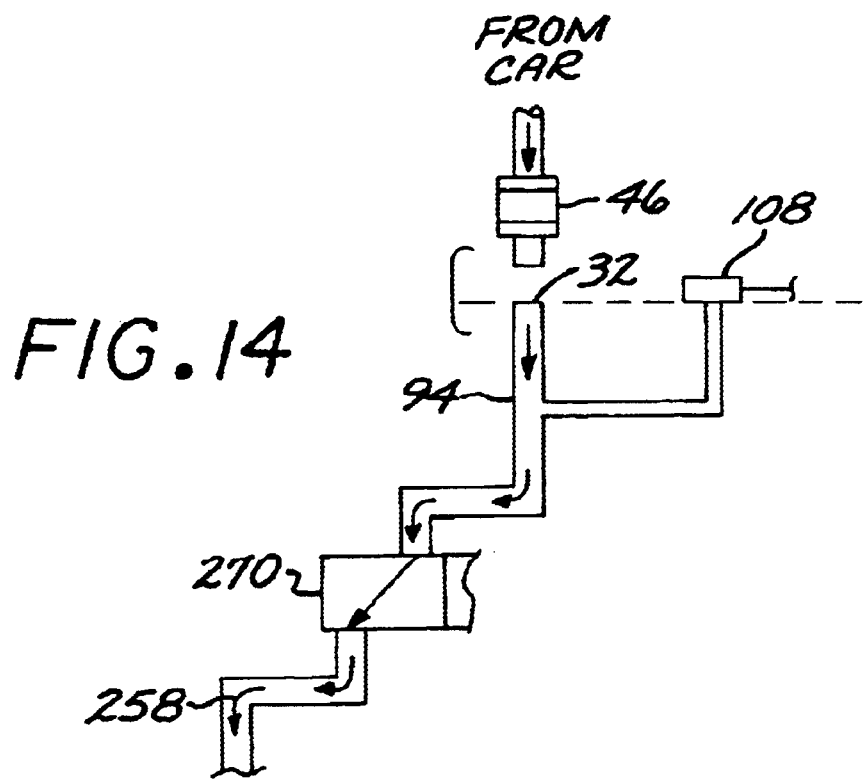
FIG. 14 is a partial sectional view taken from FIG. 7 illustrating another plumbing segment for accommodating a reverse hose flow configuration.

Referring now to FIGS. 2, 7, and 13–14, in those instances where the operator has incorrectly coupled the servicing hoses 44 and 46 to the servicing apparatus 20 so that used fluid enters through the exhaust port 32 instead of the return port 34 and the start button 144 on the control panel 130 is depressed, the controller 28, upon receiving a signal that no fluid is entering the used fluid tank 40 and detecting fluid pressure via the pressure sensor 108, reacts accordingly by energizing the crossflow valve 270 to assume its cross flow position 276. As shown in FIGS. 7 and 14, in this position, it will be appreciated that fluid entering through the exhaust port 32 will be directed through the solenoid 270 to cross over to the drain path, generally designated 257, to flow in the direction indicated by arrow 258, where the used fluid may then be expelled through drain port 36 to be collected in the used fluid tank 40. In such scenario, service hose 46 is an inhose and port 32 is an inflow port. Likewise, new fluid supplied from the pump 24 in the supply path, generally designated 293, to flow in the direction indicated by arrow 261, and passing through filter 88 flows through the check valve 92 and cross over valve 270 and is directed to the return port 34 which in this scenario operates as an outflow port and hose 44 is an outhose (FIGS. 7 and 13). With the solenoid 270 configured in the cross position 276, normal transmission fluid exchange procedures may be performed as described for the first embodiment above. Thus, it will be appreciated that such valve 270 enables the operator to connect the hoses 44 and 46 without concern as to the flow direction as determined by the transmission configuration. Once the controller 28 establishes the proper valve position 272, 274, or 276, all servicing procedures may be performed as described above for the first embodiment.

Figure 15:
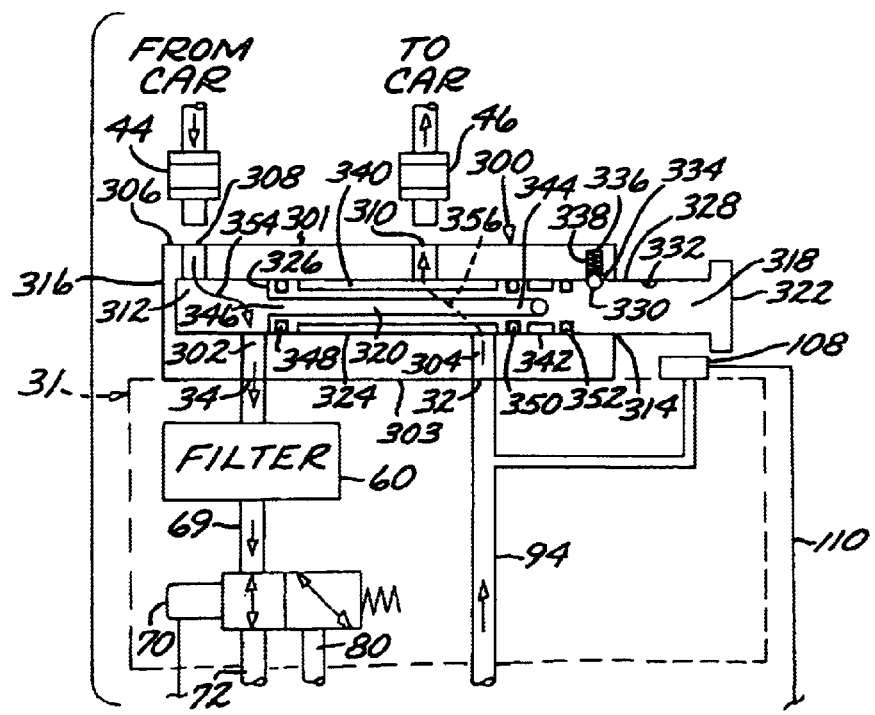
FIG. 15 is a partial sectional view taken from the plumbing circuit in FIG. 6 including an auxiliary valving component in a first position illustrating an exemplary fluid distribution path.
Figure 16:
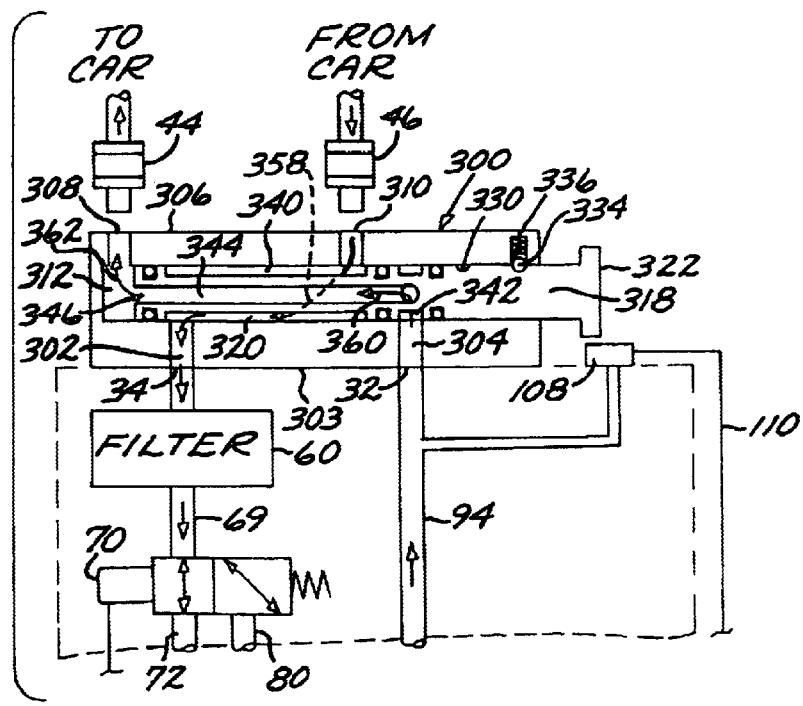
FIG. 16 is a similar view as illustrated in FIG. 15 including the auxiliary valving component in a second position illustrating an alternative exemplary fluid distribution path.

Referring now to FIGS. 15–16, wherein like components are like numbered, an alternative valving component, generally designated 300, may be used in conjunction with a plumbing circuit, such as that illustrated in FIG. 6, to provide normal drain, supply, and fluid exchange capability as well manually controlled cross over flow capability in the event the servicing hoses 44, 46 are coupled incorrectly to the return port 34 and exhaust port 32 of the servicing apparatus 20.

In general terms, the manual cross over valve 300 includes a rectangular housing 301 mounted to the manifold 31 of the servicing apparatus 20 using conventional fasteners such that an inner surface 303 of the housing abuts the manifold 31 and an outer surface 306 projects outside the cabinet 22 exposing an auxiliary return port 308 and an auxiliary exhaust port 310 which are constructed similarly to the return port 34 and exhaust port 32 to receive the free ends of the servicing hoses 44 and 46. The inner surface 303 of the housing 301 includes a first passthrough port 302 aligned with the inlet to the return port 34 and a second passthrough port 304 aligned with the outlet of the exhaust port 32 of the manifold 31. Alternatively, rigid or flexible fluid couplings may be connected between the passthrough ports and the exhaust and return ports to provide fluid communication therebetween. Thus, the valve 300 does not have to be mounted directly to the manifold. Each of ports 302, 304, 308, and 310 projects inwardly from their respective inner or outer surfaces into the housing and terminates at a central, cylindrical bore 312 projecting longitudinally throughout the housing from an open end 314 to a closed end 316. Thus fluid entering any one of these ports may be communicated inwardly to the central bore 312. Within the bore 312 partially resides a cylindrical plunger 318 or valve body including a hollow elongated section 320 slidably received in the bore and which transitions to an enlarged push/pull knob 322 near the open end 314 of the bore. The knob is positioned outside the housing for access by the operator to manually move the plunger through the bore. A reduced diameter stem 324 projects along the length of the elongated section between an enlarged flared end 326 proximate the closed end 316 of the bore 312 and an opposing enlarged elongated locking end 328 proximate the open end 314 of the bore. The outer surface of the locking end includes a normal position detent 330 and a cross flow position detent 332 which cooperate with a ball bearing 334 forced outwardly by a coil spring 336 set in a slot 338 projecting radially outwardly from the inner surface of the bore 312 to releasably lock the plunger in a normal flow configuration (FIG. 15) or a cross flow configuration (FIG. 16).

A fluid transfer gap 340 is formed between the inner surface of the central bore 312 and outer surface of the reduced diameter stem 324. The plunger 318 further includes a cross over diverter port 342 which may be aligned with the second passthrough port 304 to receive fluid exiting the exhaust port 32 and entering the second passthrough port into a cross over canal 344 projecting through the hollow plunger. The cross over canal may direct fluid entering the diverter port 342 through the plunger and out of the open end 346 of the plunger near the closed end 316 of the central bore 312 where the fluid may then be directed out the auxiliary return port 308. Inner, middle, and outer O-rings 348, 350, and 352 inhibit undesirable leakage of the fluid from the housing 301.

As will now be described, the plunger 318 and housing 301 cooperate to form a two-position manually controlled valve to be used in conjunction with the manifold 31. Referring now to FIG. 15, in normal use, the plunger 318 is selectively positioned by the operator grasping and pulling the knob 322 away from the housing 301 such that the ball bearing 334, as forced outwardly by the coil spring 336, nests partially within the inner detent 330. The servicing hose 44 is connected from the transmission outlet to the auxiliary return port 308 and the service hose 46 is connected between the transmission inlet and the auxiliary exhaust port 310. Assuming the hoses have been connected properly, in this normal valve configuration, fluid exiting the return hose 44 is directed into the auxiliary return port 308 along the direction of arrow 354 and into first passthrough port 302 and then is directed into return port 32 of the manifold 31 where the fluid may continue along the drain path or recirculation path as described above. It will be appreciated that in this normal configuration, fluid is blocked from exiting the cross over canal 344 as the diverter port 342 is not aligned with any of the ports in the housing. In addition, in this normal configuration, fluid exiting the exhaust port 32 of the manifold 31 is directed into the second passthrough port 304 and into the fluid transfer gap 340 around the reduced diameter stem 324 in the direction of arrow 356 to flow out the auxiliary exhaust port 310 and into the service hose 46. Such fluid may then be directed into the transmission or a waste collection tank as described above. In this configuration, the valve 300 merely acts as a passthrough for fluid entering and exiting the manifold from and to the servicing hoses.

Referring now to FIG. 16, if an alert of an improper hose connection is issued by the processor 28 from a reading of the used fluid tank 40 (FIG. 6) and pressure sensor 108 after the operator selectively initiates the fluid transfer process as described above, the operator may manually shift the plunger 318 by grasping the knob 322 and pushing it inwardly into the housing until the ball bearing nests partially within the cross flow detent 332. In this condition, service hose 44 is an outhose instead of an inhose and service 46 is an inhose instead of an outhose. With the plunger positioned for cross flow configuration, the diverter port 342 is aligned with the second passthrough port 304 and the first passthrough port 302 blocked off from the auxiliary return port 308, and thus fluid exiting service hose 46, as forced by the transmission pump, may be directed into auxiliary exhaust port 310, now providing a return port, and into the fluid transfer gap 340 around the stem 324 along directional arrow 358 and into the first pasthrough port 302. The fluid is then directed into the return port 34 of the manifold 31 to be directed normally along the drain or bypass paths as described above. Fluid exiting the exhaust port 32 flows into the second passthrough port 304 to the diverter port 342 and into the transfer canal 344 along directional arrow 360. Such fluid exits the hollow end of the plunger along directional arrow 362 and out the auxiliary return port 308, now providing an exhaust port, and into service hose 44 to the transmission. Other than this adjustment if the servicing hoses 44 and 46 have been improperly connected, the servicing apparatus 20 is operated as described above.

While the above described embodiments serve particularly well in servicing automatic transmissions, the present invention further contemplates servicing other automobile fluid systems as well and provides such convenience in a single portable wheeled apparatus.

Power Steering Fluid Servicing

For example, referring now to FIGS. 4–5, another embodiment of the present invention will now be described. When an automobile is taken in for transmission servicing, it is typically necessary and convenient to exchange the power steering fluid at the same time. Advantageously, the present invention may incorporate additional plumbing to facilitate such a power steering fluid exchange. FIG. 4 illustrates the additional plumbing for adding fluid to the power steering fluid reservoir (not shown). Such new power steering fluid (PSX) circuit, generally designated 200, is a conduit or servicing hose with several inline components including a new power steering fluid tank 204 preferably having at least a two quart capacity, a new fluid filter 206, and a new power steering fluid pump 208 in fluid communication with one another and terminating at one end in a coupling 210 or free end for inserting into the open fill hole of the power steering reservoir. An inline ball valve 223 is provided proximate the hose end to open and close the PSX supply circuit 220 and prevent residual fluid in the conduit from leaking out inadvertently.

Turning now to FIG. 5, for removing fluid from the power steering reservoir, a PSX drain circuit, generally designated 220 is also provided. Such drain circuit is a servicing hose or conduit with several inline components including a drain pump 222, a used PSX filter 224 and terminating at one end in a coupling 222 or free end for insertion into the power steering fluid reservoir. An inline ball valve 225 is provided for opening and closing the drain circuit for similar purposes to ball valve 223. The other end of the PSX drain circuit is conveniently coupled to the used fluid tank 28 (FIG. 6) so that one common tank may accept either used transmission fluid or used PSX fluid. Such PSX supply pump 208 and PSX drain pump 222 are connected to the controller 28 (FIG. 6) which may actuate either pump. The PSX supply and drain pumps may also be powered by the battery cable 120 connection to a 12 volt DC power source such as the vehicle battery.

Referring now to FIG. 2, the operator may depress the power steering button 180 located on the control panel 130 to initiate a power steering fluid exchange by setting the servicing apparatus 20 in PSX mode. Alternatively, the power steering exchange may be performed using a remote pendant 230 having an "ADD" button 221 and a "DRAIN" button 227 (FIG. 1). Such pendant may be directly connected to the controller 28 via suitable electrical cabling or communicate with the controller using wireless technology including radio frequency or infrared communication. It is further contemplated that the ball valves 223, 225 may be coupled to the pendant 230 and remotely actuatable. Conveniently, when not in use, the pendant is releasably retained on the control panel using a removable magnetic holder 229 placed on the control board 130 in the pendant dock region 140 (FIGS. 1 and 2).

In operation, and with particular attention to FIGS. 1–2, 4 and 5, to exchange the power steering fluid in the power steering fluid reservoir, the following exemplary procedure may be used. The apparatus 20 is initially wheeled over near the vehicle and the operator attaches the battery cables 120 to the vehicle battery providing power to the servicing apparatus 20 and drain and supply pumps 208, 222. The operator may then depress the power steering button 180 to set the servicing apparatus 20 into power steering fluid exchange mode. "PS" will display in the display counter 136 on the control board 130 to indicate power steering mode is engaged. The cap of the power steering reservoir, and any screen, is removed. The operator may then start the vehicle ignition to start the engine running. The PSX drain coupling 222, which may be an open hose end is placed inside the power steering reservoir as is the supply coupling 210, also an open hose end. The hoses are preferably equal in length and are disposed near the bottom of the power steering fluid reservoir and are maintained at all times beneath the top fluid level in the fluid reservoir. Each ball valve 223, 225, of the respective supply and drain circuits 200, 220 are opened fully. Conveniently, the remote pendant 230 may be removed from its holder 229 and held by the operator to extend operator mobility. The magnetic holder may then be used to hold the hoses of the drain and supply conduits in place to prevent the hoses from tangling. With the ball valves 223, 225 open, the operator depresses the Add and Drain buttons 221, 227 on the pendant 230 alternately to repeatedly drain and fill the reservoir while observing the fluid level in power steering fluid reservoir (FIGS. 1, and 4–5). This flushes the old fluid out of the reservoir. With the engine still running, the operator turns the steering wheel fully to the left and right and then back to the center and then checks the fluid color in the reservoir. Using the pendant allows the operator to move between the steering wheel and fluid reservoir. The alternating drain and fill step and wheel turning step are repeated until a satisfactory fluid color is observed. During this process, the processor 28 monitors the used fluid tank 40 level via the used fluid sensor 102. If a used fluid tank overflow condition is anticipated, the processor 28 disables the drain button 227 on the pendant, illuminates the used fluid full indicator 172, and sounds an alarm.

Once the operator notes the desired fluid color indicating the exchange is complete, the operator may depress the ADD button 221 on the pendant to top off the power steering fluid reservoir. Alternatively, the operator may observes bubbles in the power steering fluid reservoir indicating that the new fluid supply has been exhausted. The operator may then turn off the engine off and replace the cap and screen, if any, on the power steering fluid reservoir. Depressing the power steering button 180 again resets the servicing apparatus to automatic transmission fluid exchange mode. It is apparent that the remote pump actuator conveniently allows the operator to move back and forth between the vehicle steering wheel and the power steering fluid reservoir as necessary.

It will be appreciated that system described herein is capable of performing a number of operations including draining the used ATF fluid from the transmission, adding new ATF fluid to the transmission, draining the used fluid tank, draining the new ATF tank, using a single common pump coupled to a fluid circuit provided by an integrated manifold assembly constructed to minimize assembly time. Additional plumbing features may also be introduced to perform cross flow situations as well as service the power steering reservoir with a servicing apparatus incorporating a minimal amount of components.

The common pump 24 is preferably a one-way 130 psi pump available from Shur-Flo. The power steering drain and fill pumps 208, 220 are also available from Shur-Flo and of a 45 psi variety. Other suitable pump varieties may also be used. The pressure switch is preferably set to about 6 psi and is available from the Nason Company.

It will be appreciated that the drain path 58 (FIG. 10) between the return port 34 and drain port 36 is formed almost entirely within the manifold body as is the recirculation path 59 (FIG. 8) between the return port 34 and exhaust port 32. Such paths only exit the manifold body to enter filter 60. In addition, much of the dump and supply path 61, 63, respectively, lengths are formed within the manifold body 31 as well with only a relatively short segment extending outside the manifold body to pass through the pump 24 or filter 88. Incorporation of a number of right angles in the pathways is formed using three longitudinally projecting bores which are perpendicular from the passages projecting from the ports on the rear and top surfaces of the manifold body 31. The bores ends are plugged during manufacture 192. By forming most of the fluid circuit within the manifold body, the hose length requirements are significantly reduced and the drawbacks of using hose segments such as those caused by high temperatures are effectively removed as well.

While a rigid manifold body having a preformed fluid circuit has been described in these exemplary embodiments, it is contemplated that such manifold body could also be a hollow or a partially hollow shell incorporating flexible or rigid conduits internally between the various ports.

While the present invention has been described herein in terms of a number of preferred embodiments for performing fluid servicing procedures on a vehicle, various changes and improvements may also be made to the invention without departing from the scope thereof.

What is claimed is:

1. An apparatus for servicing an automobile fluid containing subsystem having a fluid reservoir with a subsystem pump and an inlet port and an outlet port, said apparatus comprising:

a manifold defining a first manifold port for coupling to said inlet port, a second manifold port for coupling to said outlet port, a fresh fluid manifold port, a used fluid manifold port, and a fluid transfer circuit therebetween;

a first valve having a valve inlet port in communication with said second manifold port and a valve outlet port in communication with said first manifold port and said used fluid port, said first valve being selectively operable to place said second manifold port in communication with either said first manifold port or said used fluid manifold port;

a fresh fluid source coupled to said fresh fluid manifold port;

a common pump interposed between said fluid manifold ports and said first manifold port for pumping a fluid from either of said fluid manifold ports to said first manifold port;

a second valve having a valve outlet port in communication with said common pump and a valve inlet port in communication with said used fluid manifold port and said fresh fluid manifold port, said second valve being selectively operable to place said used fluid manifold port or said fresh fluid manifold port in communication with said first manifold port;

whereby, upon coupling said first manifold port to said inlet port and said second manifold port to said outlet port, said subsystem pump may be activated and said common pump may be selectively operated to direct at least one fluid through said fluid transfer circuit as determined by the selective operation of at least one of said valves.

2. The apparatus as set forth in claim 1 wherein:

said first manifold port is a return port;

said second manifold port is an exhaust port; and said fluid transfer circuit includes a drain path for directing fluid entering said return port to said used fluid manifold port, a bypass path for directing fluid entering said return port to said exhaust port, a supply path for directing fluid entering said fresh fluid manifold port to said exhaust port, and a dump path for directing fluid entering said used fluid manifold port to said exhaust port.

3. The apparatus as set forth in claim 2 wherein:

said manifold is constructed to cause said drain and bypass paths to diverge at a point in said fluid transfer circuit downstream from said return port.

4. The apparatus as set forth in claim 3 wherein:

said first valve is disposed in said fluid transfer circuit at said point of divergence and is selectively operable between a drain position and a bypass position.

5. The apparatus as set forth in claim 2 wherein:

said manifold is constructed to cause said supply and dump paths to converge at a point in said fluid transfer circuit upstream of said exhaust port.

6. The apparatus as set forth in claim 5 wherein:

said second valve is disposed in said fluid transfer circuit at said point of convergence and is selectively operable between a supply position and a dump position.

7. The apparatus as set forth in claim 2 wherein:

said paths are formed of adjacent linear segments within said manifold.

8. The apparatus as set forth in claim 1 wherein:

said manifold includes a suction port downstream of said second valve and a pressure port upstream of said first manifold port; and said common pump includes a suction side coupled to said suction port via a suction hose and a pressure side coupled to said pressure port via a pressure hose.

9. The apparatus as set forth in claim 1 further including:

a used fluid receptacle coupled to said used fluid manifold port.

10. The apparatus as set forth in claim 9 wherein:

said used fluid receptacle includes a used fluid sensor for providing an indicator proportional to a used fluid level in said used fluid receptacle; and said fresh fluid source includes a new fluid sensor for providing an indicator proportional to a fresh fluid level in said fresh fluid source.

11. The apparatus as set forth in claim 10 further including:

a controller coupled to said used fluid sensor for receiving a first signal proportional to a level of fluid within said used fluid tank, said processor being coupled to said new fluid sensor for receiving a second signal proportional to a level of fluid within said fresh fluid source.

12. The apparatus as set forth in claim 11 wherein:

said controller is coupled to said common pump and said valves which are selectively operable based on signals received from said used and new fluid sensors.

13. The apparatus as set forth in claim 11 further including:

a pair of battery cables in electrical communication with said controller, said pump, and said valves for connecting to a power source.

14. The apparatus as set forth in claim 11 wherein:

said controller includes a processor and is coupled to a control board for receiving operator commands.

15. The apparatus as set forth in claim 14 wherein:

said control board includes an options menu region listing a plurality of servicing options available to an operator, a display region including a counter display and a plurality of status and informational indicators, and a control region including a plurality of actuator buttons for inputting operator commands to said controller.

16. The apparatus as set forth in claim 15 wherein:

said control region includes a start button which is selectively operable to transmit a signal to said controller to initiate a fluid exchange mode.

17. The apparatus as set forth in claim 15 wherein:

said control region includes a cycle sensors button which is selectively operable to transmit a signal to said controller to actuate said first and second valves back and forth between valve positions.

18. The apparatus as set forth in claim 15 wherein:

said control region includes a quantity selection button which is selectively operable to illuminate one of a plurality of quantity indicators in said status region and transmit a selected quantity signal to said controller.

19. The apparatus as set forth in claim 15 wherein:

said processor is programmed to accumulate a total quantity of fluid measured by at least one of said used or new fluid sensors and display said total quantity in said counter display upon actuation of a button in said control region.

20. The apparatus as set forth in claim 15 wherein:

said control region includes a drain button which is selectively operable to transmit a signal to said processor to actuate said second valve to a dump position and said common pump to pump fluid from said used fluid receptacle to said second port.

21. An apparatus as set forth in claim 15 wherein:

said control region includes an options button for selectively scrolling through said options menu listing and displaying a selected option in said display counter, said selected option being initiated upon selection of a start button in said control region.

22. An apparatus as set forth in claim 15 wherein:

said display region includes an indicator which illuminates to alert an operator of an incorrect hose coupling condition.

23. The apparatus as set forth in claim 9 further including:

wherein said manifold, said used fluid receptacle, said fresh fluid source, and said common pump are housed in a wheeled cabinet.

24. The apparatus as set forth in claim 2 wherein:

said first valve is selectively operable to cross over the flow of fluid between the drain path and the supply path.

25. The apparatus as set forth in claim 24 wherein:

said first valve is a 3-position, 4-way solenoid valve including a fluid exchange position, a circulation position, and a cross over flow position.

26. The apparatus as set forth in claim 1 further including:

a fluid transfer segment leading to said second manifold port and including a pressure sensor in communication with said fluid transfer segment for sensing fluid pressure in said segment.

27. The apparatus as set forth in claim 1 further including:

a drain side filter connected to said manifold and interposed between said second manifold port and said first valve.

28. The apparatus as set forth in claim 1 further including:

a supply side filter connected to said manifold and interposed between said pump and said first manifold port.

29. The apparatus as set forth in claim 1 further including:

a first filter connected to said manifold and interposed between said second manifold port and said first valve; and a second filter connected to said manifold and interposed between said pump and said first manifold port.

30. The apparatus as set forth in claim 29 wherein:

said first and second filters are connected to said manifold by first and second threaded, hollow, nipples.

31. The apparatus as set forth in claim 1 further including;

a check valve interposed between said pump and said first manifold port for preventing a backflow of fluid from entering an outlet of said pump.

32. The apparatus as set forth in claim 1 wherein:

said common pump is irreversible.

33. The apparatus as set forth in claim 1 wherein:

said common pump incorporates a check valve for maintaining pump in a primed condition when in use.

34. The apparatus as set forth in claim 1 wherein:

wherein said first and second valves are 2-position, 3-way solenoid valves.

35. An apparatus as set forth in claim 1 wherein:

said common pump is the sole pump in said apparatus.

36. The apparatus as set forth in claim 1 further including:

an auxiliary valve interposed between said manifold and said subsystem, said auxiliary valve including a housing with a central bore and an auxiliary return port for coupling to said inlet port or said outlet port of said subsystem, an auxiliary exhaust port for coupling to the other of said inlet port or outlet port of said subsystem, a first passthrough port coupled to said second manifold port, and a second passthrough port coupled to said first manifold port; and a valve body slidably received in said bore and, when in use, selectively positionable between a first position placing said auxiliary return port in fluid communication with said second manifold port and said auxiliary exhaust port in fluid communication with said first manifold port and a second position placing said auxiliary return port in fluid communication with said first manifold port and said auxiliary exhaust port in fluid communication with said first manifold port.

37. A method of servicing an automobile subsystem including a fluid reservoir having an upstream component and a downstream component and a subsystem pump with a servicing apparatus having a return hose coupled to said downstream component and a supply hose coupled to said upstream component and including an apparatus pump and a processor, said method comprising:

selecting a fluid quantity to be exchanged;

activating said subsystem pump to pump subsystem fluid into said servicing apparatus via said return hose;

removing an incremental amount of subsystem fluid less than said selected fluid quantity by opening a drain passage;

closing said drain passage upon removing said incremental amount of subsystem fluid;

opening a supply passage;

activating said apparatus pump to pump a second fluid through said supply passage into said subsystem via said supply hose;

adding said incremental amount of said second fluid into said fluid reservoir;

deactivating said apparatus pump upon adding said incremental amount of said second fluid into said fluid reservoir; and repeating said removing through deactivating steps until a total incremental amount of fluid added to said subsystem is greater than or equal to said selected fluid quantity.

38. The method of claim 37 further including:

coupling a used fluid tank with a used fluid sensor to said drain passage for collecting said subsystem fluid; and coupling a new fluid supply with a new fluid sensor to said supply passage.

39. The method of claim 38 further including:

reading said used fluid sensor with said processor to determine said incremental amount of subsystem fluid.

40. The method of claim 38 further including:

reading said new fluid sensor with said processor to determine said incremental amount of said second fluid.

41. The method of claim 38 further including:

reading said used fluid sensor with said processor to determine said incremental amount of subsystem fluid;

reading said new fluid sensor with said processor to determine said incremental amount of said second fluid; and selectively operating said apparatus pump with said processor based on at least one of said reading steps.

42. The method of claim 37 further including:

providing a circulation passage in said service apparatus;

circulating one of said subsystem fluid or said second fluid between said servicing apparatus and said subsystem reservoir through said circulation passage and said return and supply hoses.

43. The method of claim 37 further including:

providing a selectively operable valving component coupled to said processor for opening and closing said drain passage and opening said supply passage.

44. The method of claim 37 further including:

coupling a used fluid tank to a drain port of said drain passage;

collecting said incremental amounts of subsystem fluid in said used fluid tank to store a collected fluid;

uncoupling said supply hose from said upstream component;

opening a dump passage in communication with said drain port; and actuating said apparatus pump to pump said collected fluid from said used fluid tank through said dump passage and expelling said collected fluid out said supply hose.

45. A fluid exchanging apparatus for servicing automobile subsystems having a fluid reservoir including a subsystem pump and an effluent port and an influent port, said apparatus comprising:

a fluid circuit including a drain path for directing fluid entering a return port to a used fluid port, a bypass path for directing fluid entering said return port to an exhaust port, a supply path for directing fluid entering a fresh fluid supply port to said exhaust port, and a dump path for directing fluid entering said used fluid port to said exhaust port;

a rigid manifold body housing at least a portion of said fluid circuit and including a suction port and a pressure port common to said dump and supply paths;

a divergence of said drain and bypass paths downstream from said return port;

a convergence of said supply and dump paths upstream of said used fluid port and said supply port;

a first solenoid valve interposed in said divergence of said drain and bypass paths and selectively operable between at least a drain position and a bypass position;

a second solenoid valve interposed in said convergence of said supply and dump paths and selectively operable between at least a supply position and a dump position;

a common pump coupled to said suction port and said pressure port and interposed in said fluid circuit between said convergence and said exhaust port for directing fluid entering one of said used fluid or supply ports to said exhaust port;

a used fluid collection tank including a used fluid sensor and including a used fluid conduit for connecting to said drain port;

a new fluid supply including a new fluid sensor and a fresh fluid conduit for connected to said supply port;

a control board for receiving operator commands; and a processor coupled to said control board, said used and new fluid sensors, said pump and said solenoids whereby, upon connecting said return port to said effluent port and said exhaust port to said influent port and actuating said subsystem pump, and further upon receipt of an operator command from said control board, said processor may selectively operate said common pump and selectively position said solenoids based on readings of said used and new fluid sensors and said operator command to direct fluid through said fluid circuit and between said apparatus and said subsystem.

46. An apparatus for servicing automobile subsystems having a fluid reservoir with an effluent port and an influent port, said apparatus comprising:

a fluid circuit including a drain path connecting a return port to a used fluid port, a bypass path connecting said return port to an exhaust port, a supply path connecting a fresh fluid supply port to said exhaust port, and a dump path connecting said used fluid port to said exhaust port, said drain and bypass paths having a first common section terminating in a divergence downstream from said return port, and said supply and dump paths forming a convergence to a second common section upstream of said exhaust port;

a flow diverter means including a first component in said divergence for diverting flow between said drain and bypass paths and a second component in said convergence for diverting flow between said supply and dump paths; and pumping means interposed upstream of said convergence for pumping fluid from one of said drain or supply ports to said exhaust port.

47. The apparatus set forth in claim 46 further including;

a tank collection means for collecting a first fluid expelled through said drain port; and a supply means for storing a second fluid to be withdrawn through said supply port by said pumping means.

48. The apparatus as set forth in claim 46 further including;

controlling means including a processor coupled to said pumping means and said flow diverter means for selectively operating said pumping means and said flow diverter means to direct fluid through said fluid circuit.

49. An apparatus for exchanging fluid with a vehicle component having a reservoir with an inlet and an outlet, said apparatus comprising:

a fluid circuit defining a supply path and a dump path having a common fluid delivery section, said supply path connecting a supply manifold port to an exhaust port and including fresh fluid delivery section, said dump path connecting a used fluid manifold port to said exhaust port and including a used fluid delivery section, said common fluid delivery section being formed between a convergence of said fresh and used fluid delivery sections and said exhaust port and including a suction port and a pressure port;

a pump coupled to said suction and pressure ports;

a valving component interposed in said convergence and selectively operable to open a passage between either of said fresh and used fluid delivery sections and said common section.

50. The apparatus as set forth in claim 49 further including:

a used fluid tank coupled to said used fluid manifold port; and a fresh fluid supply coupled to said supply manifold port.

* * * * *